(12) United States Patent
Zhang et al.

(10) Patent No.: US 12,183,917 B2
(45) Date of Patent: *Dec. 31, 2024

(54) SECONDARY BATTERY COMPRISING POSITIVE ELECTRODE PLATE AND NON-AQUEOUS ELECTROLYTE SOLUTION

(71) Applicant: CONTEMPORARY AMPEREX TECHNOLOGY (HONG KONG) LIMITED, Hong Kong (CN)

(72) Inventors: Limei Zhang, Ningde (CN); Peipei Chen, Ningde (CN); Yao Jiang, Ningde (CN); Jiao Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,563

(22) Filed: Jun. 7, 2024

(65) Prior Publication Data

US 2024/0322142 A1 Sep. 26, 2024

Related U.S. Application Data

(63) Continuation of application No. PCT/CN2022/084834, filed on Apr. 1, 2022.

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/5825* (2013.01); *H01M 4/587* (2013.01);
(Continued)

(58) Field of Classification Search
CPC ...... H01M 4/366; H01M 4/625; H01M 4/583; H01M 10/0525; H01M 4/505; H01M 4/58; H01M 4/5825
See application file for complete search history.

(56) References Cited

U.S. PATENT DOCUMENTS

| | | | | |
|---|---|---|---|---|
| 2012/0231334 A1* | 9/2012 | Kinoshita | ............. | H01M 4/366 429/211 |
| 2013/0209886 A1* | 8/2013 | Ohira | .................... | H01M 4/505 252/500 |

(Continued)

FOREIGN PATENT DOCUMENTS

| | | | | |
|---|---|---|---|---|
| CN | 101217204 A | * | 7/2008 | ........ H01M 10/0525 |
| CN | 101859887 A | | 10/2010 | |

(Continued)

OTHER PUBLICATIONS

International Search Report received in the corresponding International Application PCT/CN2022/084834, mailed on Nov. 30, 2022.

(Continued)

*Primary Examiner* — Imran Akram
(74) *Attorney, Agent, or Firm* — Kilpatrick Townsend & Stockton LLP

(57) ABSTRACT

Provided are a secondary battery, a battery module, a battery pack and an electrical apparatus. The secondary battery includes a positive electrode plate and a non-aqueous electrolyte solution. A positive electrode active material includes an inner core and a shell cladding the inner core. The inner core includes $Li_{1+x}Mn_{1-y}A_yP_{1-z}R_zO_4$. The shell includes a first cladding layer cladding the inner core and a second cladding layer cladding the first cladding layer. The first cladding layer includes pyrophosphate $MP_2O_7$ and phosphate $XPO_4$. The second cladding layer includes carbon. The non-aqueous electrolyte solution includes a first additive.

(Continued)

The first additive includes one or more compounds in a group consisting of a compound shown in Formula 1, a compound shown in Formula 2 and a compound shown in Formula 3. The rate performance, cycling performance and high temperature stability of a lithium manganese phosphate secondary battery are increased.

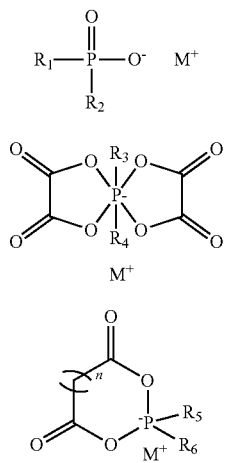

Formula 1

Formula 2

Formula 3

20 Claims, 5 Drawing Sheets

(51) Int. Cl.
*H01M 4/58* (2010.01)
*H01M 4/587* (2010.01)
*H01M 10/0525* (2010.01)
*H01M 10/0567* (2010.01)
*H01M 10/0569* (2010.01)
*H01M 10/42* (2006.01)

(52) U.S. Cl.
CPC ... *H01M 10/0525* (2013.01); *H01M 10/0567* (2013.01); *H01M 10/0569* (2013.01); *H01M 10/4235* (2013.01); *H01M 2004/028* (2013.01); *H01M 2220/20* (2013.01); *H01M 2300/0037* (2013.01)

(56) References Cited

U.S. PATENT DOCUMENTS

| | | | |
|---|---|---|---|
| 2013/0224594 A1* | 8/2013 | Yushin | H01M 4/38 |
| | | | 252/182.1 |
| 2014/0186714 A1* | 7/2014 | Kamimura | C01B 25/45 |
| | | | 429/231.95 |
| 2015/0221940 A1* | 8/2015 | Shimonishi | H01M 4/625 |
| | | | 429/223 |
| 2016/0049645 A1* | 2/2016 | Zheng | H01M 4/505 |
| | | | 429/223 |
| 2020/0067080 A1* | 2/2020 | Pan | H01M 4/48 |

FOREIGN PATENT DOCUMENTS

| | | | | |
|---|---|---|---|---|
| CN | 103050694 A | | 4/2013 | |
| CN | 103515594 A | | 1/2014 | |
| CN | 108808078 A | * | 11/2018 | ........ H01M 10/0525 |
| CN | 109301174 A | | 2/2019 | |
| CN | 114203991 A | | 3/2022 | |
| CN | 114242988 A | | 3/2022 | |
| CN | 114695960 A | * | 7/2022 | |
| EP | 3787090 A1 | * | 3/2021 | .......... H01M 10/052 |
| JP | 2017073378 A | * | 4/2017 | .......... H01M 10/052 |
| JP | 2021157925 A | | 10/2021 | |
| WO | WO-2022126139 A2 | * | 6/2022 | ........ H01M 10/0525 |

OTHER PUBLICATIONS

Written Opinion of ISA received in the corresponding International Application PCT/CN2022/084834, mailed on Nov. 30, 2022.

* cited by examiner

SECONDARY BATTERY COMPRISING POSITIVE ELECTRODE PLATE AND NON-AQUEOUS ELECTROLYTE SOLUTION

CROSS REFERENCE TO RELATED APPLICATION

The present application is a continuation of International Application PCT/CN2022/084834, filed on Apr. 1, 2022 and entitled "SECONDARY BATTERY, BATTERY MODULE, BATTERY PACK AND ELECTRICAL APPARATUS", which is incorporated in its entirety herein by reference.

TECHNICAL FIELD

The present application relates to the technical field of lithium batteries, and in particular to a secondary battery, a battery module, a battery pack and an electrical apparatus.

BACKGROUND

In recent years, with the increasingly wide use of lithium-ion batteries, lithium-ion batteries are widely used in energy storage power systems such as water power, thermal power, wind power and solar power stations, as well as power tools, electric bicycles, electric motorcycles, electric vehicles, military equipment, aerospace and other fields. Due to the great development of lithium-ion batteries, higher requirements have also been put forward for their energy density, cycling performance and safety performance.

Compared with other positive electrode active materials, a lithium manganese phosphate positive electrode active material has higher safety and cycle life, but the lithium manganese phosphate has the disadvantage of poor rate performance. At present, this problem is usually solved by means of cladding or doping. However, it is still hoped to further increase the rate performance, cycling performance, high temperature stability and the like of the lithium manganese phosphate positive electrode active material.

SUMMARY OF THE INVENTION

The present application is conducted in view of the above problem, and aims to provide a secondary battery, a battery module, a battery pack and an electrical apparatus to solve the problems of poor rate performance and cycling performance of lithium manganese phosphate secondary batteries.

In order to achieve the above objectives, a first aspect of the present application provides a secondary battery, including a positive electrode plate and a non-aqueous electrolyte solution. A positive electrode active material includes an inner core and a shell cladding the inner core. The inner core includes $Li_{1+x}Mn_{1-y}A_yP_{1-z}R_zO_4$, where $x=-0.100-0.100$, $y=0.001-0.500$, and $z=0.001-0.100$; A is selected from one or more elements in a group consisting of Zn, Al, Na, K, Mg, Mo, W, Ti, V, Zr, Fe, Ni, Co, Ga, Sn, Sb, Nb and Ge, and optionally one or more elements in a group consisting of Fe, Ti, V, Ni, Co and Mg; and R is selected from one or more elements in a group consisting of B, Si, N and S. The shell includes a first cladding layer cladding the inner core and a second cladding layer cladding the first cladding layer, where the first cladding layer includes pyrophosphate $MP_2O_7$ and phosphate $XPO_4$, where M and X are independently selected from one or more elements in a group consisting of Li, Fe, Ni, Mg, Co, Cu, Zn, Ti, Ag, Zr, Nb and Al; and the second cladding layer includes carbon.

The non-aqueous electrolyte solution includes a first additive. The first additive includes one or more compounds in a group consisting of a compound shown in Formula 1, a compound shown in Formula 2 and a compound shown in Formula 3:

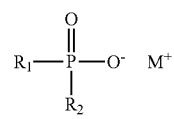

Formula 1

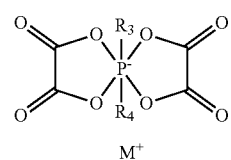

Formula 2

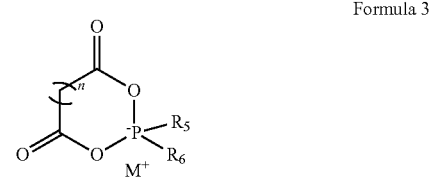

Formula 3

$R_1$ and $R_2$ independently represent any one of F, C1-C6 fluoroalkyl, C1-C6 alkyl, C1-C6 alkoxy, C2-C6 alkenyl, C2-C6 alkynyl and C6-C10 aryl, and at least one of $R_1$ and $R_2$ represents any one of F or C1-C6 fluoroalkyl;

$R_3$ and $R_4$ each independently represent any one of F, C1-C6 fluoroalkyl, C1-C6 alkyl, C1-C6 alkoxy, C2-C6 alkenyl and C2-C6 alkynyl, and at least one of $R_3$ and $R_4$ represents any one of F and C1-C6 fluoroalkyl;

$R_5$ and $R_6$ each independently represent any one of F, C1-C6 fluoroalkyl, C1-C6 alkyl, C1-C6 alkoxy, C2-C6 alkenyl, C2-C6 alkynyl, carbonyl, $O^-$, $=O$, $-^-BF_3$ and $-O^-BF_3$;

M in each chemical formula each independently represents one of alkali metals and alkaline-earth metals; and n is 0, 1 or 2.

Unless otherwise specified, in the above chemical formula, when A includes two or more elements, the definition for the value range of y is not only a definition for the stoichiometric number of each element as A, but also a definition for the sum of the stoichiometric numbers of various elements as A. For example, when A includes two or more elements A1, A2, . . . , An, respective stoichiometric numbers y1, y2, . . . , yn for A1, A2, . . . , An are required to fall within the value range defined for y in the present invention, and the sum of y1, y2, . . . , yn is also required to fall within this value range. Similarly, in the case where R includes two or more elements, the definition for the value range of the stoichiometric number of R in the present application also has the above meaning.

The lithium manganese phosphate positive electrode active material of the present application is a core-shell structure with two cladding layers, where an inner core includes $Li_{1+x}Mn_{1-y}A_yP_{1-z}R_zO_4$. In the inner core, the doping of the element A at the position of manganese in the lithium manganese phosphate helps to reduce the lattice change rate of the lithium manganese phosphate in a lithium deintercalation process, increase the structural stability of the lithium manganese phosphate positive electrode material, greatly reduce the dissolution of manganese, and reduce the oxygen activity on a particle surface. The doping of the element R at the position of phosphorus helps to change the difficulty of changing the Mn—O bond length, thereby reducing the potential barrier of lithium ion migration, promoting lithium ion migration, and increasing the rate performance of the secondary battery.

The first cladding layer of the positive electrode active material of the present application includes pyrophosphate and phosphate. Due to a higher migration potential barrier (>1 eV) of transition metals in the pyrophosphate, the dissolution of transition metals can be effectively inhibited. Moreover, the phosphate has excellent lithium ion conductivity and can reduce the content of lithium impurities on a surface. In addition, since the second cladding layer is a carbon-containing layer, the conductivity and desolvation ability of $LiMnPO_4$ can be effectively improved. In addition, the "barrier" effect of the second cladding layer can further hinder the migration of manganese ions into the electrolyte solution, and reduce the corrosion of the electrolyte solution on the active material.

As a result, by specific element doping and surface cladding of lithium manganese phosphate, the present application can effectively inhibit the dissolution of manganese ions in a lithium deintercalation process and also promote the migration of lithium ions, thereby improving the rate performance of a battery cell, and increasing the cycling performance and high temperature performance of the secondary battery.

It should be noted that as shown in FIG. 1, in the present application, by comparing XRD spectra before and after $LiMnPO_4$ doping, it can be seen that the position of a main characteristic peak of the positive electrode active material of the present application is basically consistent with that before $LiMnPO_4$ doping. This indicates that the doped lithium manganese phosphate positive electrode active material has no impurity phase, and the improvement in the performance of the secondary battery is mainly caused by element doping, rather than impurity phases.

Furthermore, a phosphate type additive is introduced into the non-aqueous electrolyte solution to form $Li_xF_yPO_4$ on the surface of pyrophosphate in a charging process of a lithium-ion battery, so as to improve the ion conductivity of the lithium manganese phosphate positive electrode active material coated with pyrophosphate, thereby further improving the capacity utilization performance and rate performance of the secondary battery including the positive electrode active material.

In any of embodiments, in Formula 1, $R_1$ and $R_2$ independently represent any one of F, C1-C3 fluoroalkyl, C1-C3 alkyl, C1-C3 alkoxy, C2-C3 alkenyl, C2-C3 alkynyl, phenyl, benzyl and methylphenyl, and at least one of $R_1$ and $R_2$ represents any one of F and C1-C3 fluoroalkyl; optionally, $R_1$ and $R_2$ independently represent any one of F, C1-C3 alkyl and C1-C3 fluoroalkyl; and optionally, the C1-C3 fluoroalkyl is —$CF_3$, —$C_2F_5$, —$CH_2CF_3$ or —$CF_2CH_3$, and the C1-C3 alkyl is methyl or ethyl.

In any of embodiments, in Formula 2, $R_3$ and $R_4$ independently represent any one of F, C1-C3 fluoroalkyl, C1-C3 alkyl, C1-C3 alkoxy, C2-C3 alkenyl and C2-C3 alkynyl, and at least one of $R_3$ and $R_4$ represents any one of F and C1-C3 fluoroalkyl; and optionally, $R_3$ and $R_4$ independently represent any one of F and C1-C3 fluoroalkyl.

In any of embodiments, in Formula 3, $R_5$ and $R_6$ independently represent any one of F, C1-C3 fluoroalkyl, C1-C3 alkyl, C1-C3 alkoxy, C2-C6 alkenyl, C2-C6 alkynyl, carbonyl, O—, =O, —$BF_3$ and —O—$BF_3$; and optionally, $R_5$ and $R_6$ independently represent any one of F, fluoromethyl, methyl, O—, =O, —$BF_3$ and —O—$BF_3$, and n is 0 or 1.

In any of embodiments, M in each chemical formula independently represents one of Li, Na and K.

Optionally, the first additive used in the present application may be arbitrarily selected from each of the above chemical formulas. In some embodiments, the first additive includes one or more of the following compounds:

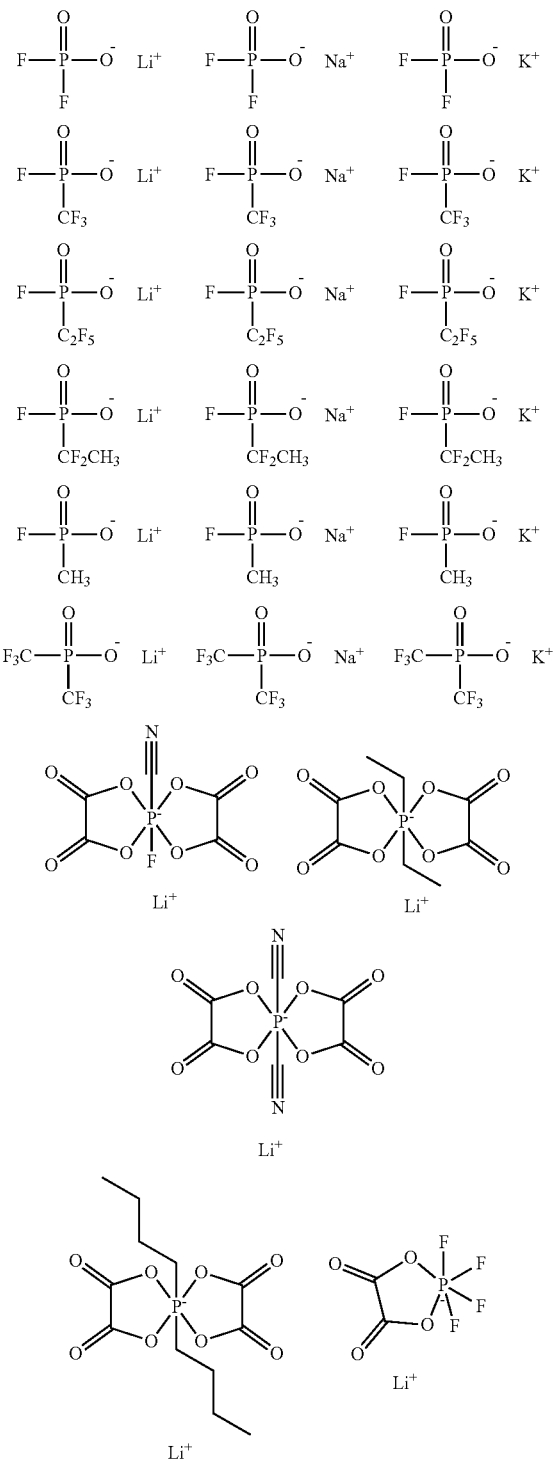

-continued

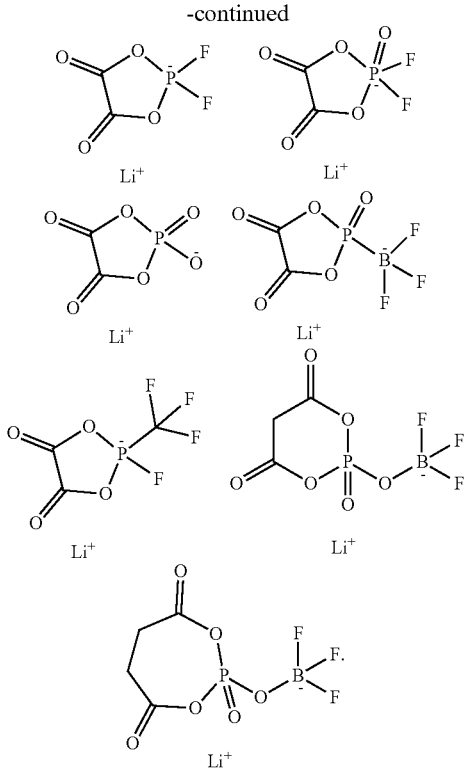

In some examples, the above first additive includes any one or more of the following compounds:

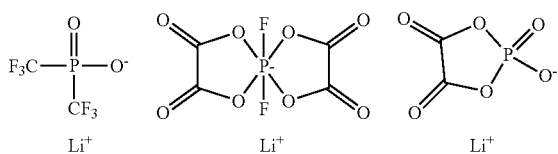

Each of the above first additives has higher efficiency in forming $Li_xF_yPO_4$ in the charging process, thus improving the ion conductivity of the positive electrode active material of the present application more efficiently.

In some embodiments, the above non-aqueous electrolyte solution further includes a second additive, and the second additive includes one or more of compounds in a group consisting of a cyclic carbonate compound containing unsaturated bonds, a halogen-substituted cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphite compound, a phosphate compound and a borate compound. The above second additive can improve the capacity, cycling performance and the like of the secondary battery according to its own performance. A corresponding second additive can be selected by those skilled in the art according to actual requirements.

In some embodiments, based on the total weight of the non-aqueous electrolyte solution, the content of the first additive is W1 wt %, and W1 is 0.01 to 20 (such as 0.01, 0.05, 0.1, 0.2, 0.3, 0.4, 0.5, 1, 2, 3, 4, 5, 8, 10, 12, 15, 18 or 20), and optionally 0.1 to 10 or 0.5 to 5; and/or the content of the second additive is W2 wt %, and W2 is 0.01 to 20 (such as 0.01, 0.05, 0.1, 0.2, 0.3, 0.4, 0.5, 1, 2, 3, 4, 5, 8, 10, 12, 15, 18 or 20), and optionally 0.1 to 10 or 0.3 to 5. The first additive with the above content not only avoids the increase in positive and negative electrode impedance caused by excessive first additive, but also ensures the high capacity and high rate performance of the secondary battery. As a result, when the mass proportion of the first additive in the non-aqueous electrolyte solution is within the above range, the first additive can significantly improve the ion conductivity of the positive electrode active material of the present application, and cannot deteriorate the positive and negative electrode impedance, thereby further improving the capacity utilization performance and rate performance of the secondary battery.

In some embodiments, W1/W2 is defined as M, and M is 0.001 to 20 (such as 0.01, 0.05, 0.1, 0.2, 0.3, 0.4, 0.5, 1, 2, 3, 4, 5, 8, 10, 12, 15, 18 or 20), and optionally 0.1 to 10. When W2/W1 is within the above range, the two can play a better synergistic role, thereby further improving the capacity utilization performance and cycling performance.

In some embodiments, the above non-aqueous electrolyte solution further includes an organic solvent, and the type of the organic solvent is not specifically limited and can be selected according to actual requirements. Optionally, the organic solvent includes one or more of a cyclic carbonate compound, a chain carbonate compound and a carboxylate compound, and further includes one or more components in a group consisting of dimethyl carbonate, diethyl carbonate, dipropyl carbonate, ethyl methyl carbonate, methyl propyl carbonate, ethyl propyl carbonate, ethylene carbonate, propylene carbonate, butene carbonate, gamma-butyrolactone, methyl formate, ethyl formate, methyl acetate, ethyl acetate, propyl acetate, methyl propionate, ethyl propionate, butyl propionate and tetrahydrofuran.

In some embodiments, the above non-aqueous electrolyte solution further includes an electrolyte salt. Optionally, the electrolyte salt includes one or more components in a group consisting of $LiN(C_xF_{2x+1}SO_2)(C_yF_{2y+1}SO_2)$, $Li(FSO_2)_2N$, $LiCF_3SO_3$, $LiPF_6$, $LiBF_4$, $LiAsF_6$, $LiClO_4$, $LiBOB$, $LiDFOB$ and $LiTFOP$, x and y represent positive integers, optionally, x and y are independently 0, 1, 2 or 3, and the concentration range of the electrolyte salt in the non-aqueous electrolyte solution is 0.5 M to 2.5 M, and optionally 0.8 M to 2 M, which can ensure that Li migrates smoothly and quickly between positive and negative electrodes.

In some embodiments, based on the weight of the inner core, the cladding amount of the first cladding layer is C1 wt %, and C1 is greater than 0 and less than or equal to 7, and optionally 4 to 5.6. When the cladding amount of the first cladding layer is within the above range, it can further inhibit the dissolution of manganese ions and further promote the transport of lithium ions. The following situations can be effectively avoided: if the cladding amount of the first cladding layer is too small, it may lead to insufficient inhibition of pyrophosphate on the dissolution of manganese ions, and the improvement in lithium ion transport performance is also not significant; and if the cladding amount of the first cladding layer is too large, it may cause the cladding layer to be too thick, increase the battery impedance, and affect the dynamic performance of the battery.

In some embodiments, based on the weight of the inner core, the cladding amount of the second cladding layer is C2 wt %, and C2 is greater than 0 and less than or equal to 6, and optionally 3 to 5. On the one hand, the carbon-containing layer as the second cladding layer can play a "barrier" function to avoid the direct contact between the positive electrode active material and the electrolyte solution, thereby reducing the corrosion of the electrolyte solution on the active material, and increasing the safety performance of the battery at a high temperature. On the other hand, the carbon-containing layer has stronger electrical conductivity and can reduce the internal resistance of the battery, thereby improving the dynamic performance of the battery. However, due to lower gram capacity of carbon materials, when the amount of the second cladding layer is too large, it may reduce the overall gram capacity of the positive electrode active material. Therefore, when the cladding amount of the second cladding layer is within the above range, the dynamic performance and safety performance of the battery can be further improved without compromising the gram capacity of the positive electrode active material.

In some embodiments, the relational expression $W1/(C1+C2)$ between the content $W1$ of the first additive and the cladding amount $C1$ of the first cladding layer as well as the cladding amount $C2$ of the second cladding layer is $C$, and $C$ is 0.001 to 2, and optionally 0.01 to 1. When $C$ is less than the above range, the film formation amount of the first additive on the surface of pyrophosphate is less, so the further improvement effect on the rate performance of the secondary battery is not significant; and when $C$ is greater than the above range, excessive first additive will increase the positive and negative electrode impedance, which affects the capacity improvement and rate performance improvement effects of the secondary battery.

In some embodiments, in the positive electrode active material, the weight ratio of pyrophosphate to phosphate in the first cladding layer is 1:3 to 3:1, and optionally 1:3 to 1:1. An appropriate ratio of pyrophosphate to phosphate is favorable for fully playing the synergistic role of the two. The following situations can be effectively avoided: if there is too much pyrophosphate and too little phosphate, it may lead to an increase in battery impedance; and if there is too much phosphate and too little pyrophosphate, the effect of inhibiting the dissolution of manganese ions is not significant.

In any of embodiments, the interplanar spacing of phosphate in the first cladding layer is 0.345 to 0.358 nm, and an included angle between crystal orientations (111) is 24.25° to 26.45°; and the interplanar spacing of pyrophosphate in the first cladding layer is 0.293 to 0.326 nm, and an included angle between crystal orientations (111) is 26.41° to 32.57°. When an interplanar spacing between phosphate and pyrophosphate in the first cladding layer and an included angle between crystal orientations (111) are within the above ranges, impurity phases in the cladding layer can be more effectively avoided, thereby further increasing the gram capacity of the material, and further increasing the cycling performance and rate performance of the secondary battery.

In any of embodiments, y is selected from any value within the range of 0.1 to 0.4. By selecting the y value within this range, the gram capacity and rate performance of the first positive electrode active material can be further improved.

In any of embodiments, M and X are independently selected from one or more of elements Li and Fe.

In any of embodiments, the ratio of y to 1−y is selected from 1:10 to 10:1, and optionally 1:4 to 1:1. Here, y represents the sum of stoichiometric numbers of elements doped at the position of Mn. When the above conditions are satisfied, the energy density and cycling performance of the secondary battery made of the positive electrode plate can be further increased.

In any of embodiments, the ratio of z to 1−z is selected from 1:999 to 1:9, and optionally 1:499 to 1:249. Here, z represents the sum of stoichiometric numbers of elements doped at the position of P. When the above conditions are satisfied, the energy density and cycling performance of the secondary battery made of the positive electrode plate can be further increased.

In any of embodiments, in the first positive electrode active material, the crystallinity of pyrophosphate and phosphate is independently 10% to 100%, and optionally 50% to 100%. In the first cladding layer of the lithium manganese phosphate positive electrode active material in this embodiment, the pyrophosphate and phosphate with certain crystallinity are favorable for maintaining the structural stability of the first cladding layer and reducing lattice defects. On the one hand, this is favorable for fully playing a role of pyrophosphate in hindering the dissolution of manganese ions, and on the other hand, this is also favorable for reducing the content of lithium impurities on the surface by phosphate and reducing the valence state of surface oxygen, thereby reducing interfacial side reactions between the positive electrode material and the electrolyte solution, reducing the consumption of the electrolyte solution, and improving the cycling performance and safety performance of the secondary battery.

In any of embodiments, A is selected from at least two of elements Fe, Ti, V, Ni, Co and Mg. By selecting doped elements within the above range, it is favorable for enhancing the doping effect. On the one hand, the lattice change rate is further reduced, thereby inhibiting the dissolution of manganese, and reducing the consumption of the electrolyte solution and active lithium. On the other hand, it is favorable for further reducing the surface oxygen activity and reducing interfacial side reactions between the positive electrode active material and the electrolyte solution, thereby improving the cycling performance and high temperature storage performance of the battery.

In any of embodiments, the Li/Mn antisite defect concentration of the first positive electrode active material is 4% or less, and optionally 2% or less. In the positive electrode active material of the present application, the Li/Mn antisite defect refers to the exchange of the positions of $Li^+$ and $Mn^{2+}$ in the lattice of $LiMnPO_4$. Since a $Li^+$ transport channel is a one-dimensional channel, $Mn^{2+}$ is difficult to migrate in the $Li^+$ transport channel. Therefore, $Mn^{2+}$ with antisite defects will hinder the transport of $Li^+$. By controlling the Li/Mn antisite defect concentration at a low level, the gram capacity and rate performance of $LiMnPO_4$ can be improved.

In any of embodiments, the lattice change rate of the positive electrode active material is 6% or less, and optionally 4% or less. The lithium deintercalation process of $LiMnPO_4$ is a two-phase reaction. The interfacial stress between two phases is determined by the magnitude of the lattice change rate, where the smaller the lattice change rate, the smaller the interfacial stress, and the easier the transport of $Li^+$. Therefore, reducing the lattice change rate of the inner core facilitates the increase of the $Li^+$ transport ability, thereby improving the rate performance of the secondary battery.

In any of embodiments, the surface oxygen valence state of the first positive electrode active material is −1.88 or less, and optionally −1.98 to −1.88. This is because the higher the valence state of oxygen in a compound, the stronger its ability to obtain electrons, that is, the stronger its oxidizability. In the first positive electrode active material of the present application, by controlling the surface valence state of oxygen at a lower level, the reactivity of the surface of the positive electrode material can be reduced, thereby further reducing interfacial side reactions between the positive electrode material and the electrolyte solution, and further improving the cycling performance and high temperature storage performance of the secondary battery.

In any of embodiments, the compacted density of the positive electrode active material at 3 tons (T) is 2.0 g/cm$^3$ or more, and optionally 2.2 g/cm$^3$ or more. When the compacted density of the first positive electrode active material is increased, the weight of the active material per unit volume increases, which is more beneficial to the increase of the volumetric energy density of the secondary battery.

A second aspect of the present application further provides a battery module, the battery module includes a secondary battery, and the secondary battery is any one of the above secondary batteries in the present application.

A third aspect of the present application further provides a battery pack, the battery pack includes a battery module, and the battery module is the above battery module in the present application.

A fourth aspect of the present application further provides an electrical apparatus. The electrical apparatus includes at least one of a secondary battery, a battery module, and a battery pack. The above secondary battery, battery module and battery pack are the secondary battery, battery module and battery pack provided in the present application.

As a result, the battery module and the battery pack of the present application have higher cycling performance and rate performance, and especially have significantly improved high temperature stability, thereby providing higher power cycle stability and high temperature operation stability for an electrical apparatus with the secondary battery, battery module or battery pack of the present application.

Figure 1:
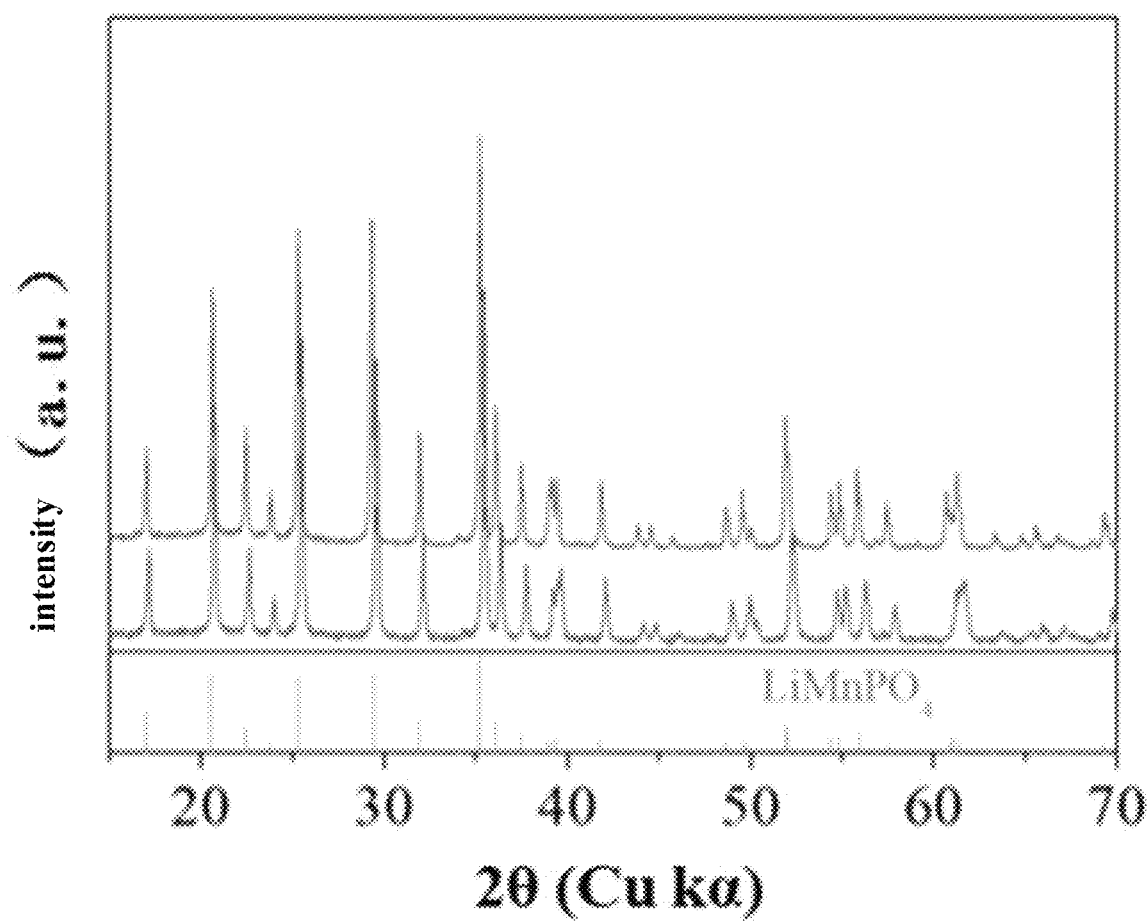
FIG. 1 is an XRD spectrum of a positive electrode active material according to an embodiment of the present application.

DESCRIPTION OF REFERENCE NUMERALS 1. battery pack; 2. upper box body; 3. lower box body; 4. battery module; 5. secondary battery; 51. case; 52. electrode assembly; 53. top cover assembly.

DETAILED DESCRIPTION

Hereinafter, the embodiments of the secondary battery, battery module, battery pack and electrical apparatus of the present application are specifically disclosed by referring to detailed descriptions of the drawings as appropriate. However, there may be cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

A "range" disclosed in the present application is defined in terms of a lower limit and an upper limit, and a given range is defined by selecting a lower limit and an upper limit, which define the boundaries of the particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is understood that ranges of 60-110 and 80-120 are also expected. Additionally, if the minimum range values 1 and 2 are listed, and if the maximum range values 3, 4 and 5 are listed, the following ranges are all expected: 1-3, 1-4, 1-5, 2-3, 2-4 and 2-5. In the present application, unless otherwise specified, the value range "a-b" represents an abbreviated representation of any combination of real numbers between a and b, where both a and b are real numbers. For example, the value range "0-5" represents that all real numbers between "0 and 5" have been listed herein, and "0-5" only represents an abbreviated representation of combinations of these values. In addition, when a parameter is expressed as an integer greater than or equal to 2, it is equivalent to disclosing that the parameter is an integer, such as 2, 3, 4, 5, 6, 7, 8, 9, 10, 11, or 12.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method includes steps (a) and (b), meaning that the method may include steps (a) and (b) performed sequentially, or may include steps (b) and (a) performed sequentially. For example, the reference to the method may further include step (c), meaning that step (c) may be added to the method in any order. For example, the method may include steps (a), (b) and (c), or may further include steps (a), (c) and (b), or may further include steps (c), (a) and (b), or the like.

Unless otherwise specified, the "including" and "comprising" mentioned in the present application mean open-ended, or may be closed-ended. For example, the "including" and "comprising" may indicate that it is possible to include or comprise other components not listed, and it is also possible to only include or comprise the listed components.

Unless otherwise specified, the term "or" is inclusive in the present application. For example, the phrase "A or B" means "A, B, or both A and B". More specifically, the condition "A or B" is satisfied by any of the following: A is true (or present) and B is false (or absent); A is false (or absent) and B is true (or present); or both A and B are true (or present).

The term "cladding layer" herein refers to a material layer that clads the inner core. The material layer may completely or partially clad the inner core, and the "cladding layer" is used merely for the convenience of description, and not intended to limit the present invention. Likewise, the term "thickness of the cladding layer" refers to the thickness of the material layer that clads the inner core along the radial direction of the inner core.

Herein, the term "source" refers to a compound that serves as a source of an element. As an example, types of the "source" include, but are not limited to, carbonates, sulfates, nitrates, elemental substances, halides, oxides, hydroxides, and the like.

The inventors of the present application have found in practical work that the dissolution of manganese ions is relatively serious in deep charging and discharging processes of the lithium manganese phosphate positive electrode active material. Although there are attempts in the prior art to clad lithium manganese phosphate with lithium iron phosphate to reduce interfacial side reactions, this cladding cannot prevent the dissolved manganese from migrating into the electrolyte solution. The dissolved manganese is reduced to metal manganese after migrating to the negative electrode. The produced metal manganese is equivalent to a "catalyst", which can catalyze the decomposition of a solid electrolyte interphase (SEI) film on the surface of the negative electrode to generate by-products. Part of the by-products are gases, which may easily cause the battery to bulge and thus affect the safety performance of the secondary battery. The other part of the by-products are deposited on the surface of the negative electrode, which will hinder the channels of lithium ions into and out of the negative electrode, resulting in an increase in the impedance of the secondary battery, thereby affecting the dynamic performance of the battery. In addition, in order to replenish the lost SEI film, active lithium inside the electrolyte solution and the battery is continuously consumed, thereby irreversibly affecting the capacity retention rate of the secondary battery.

After a lot of researches, the inventors have found that for the lithium manganese phosphate positive electrode active material, the problems of serious dissolution of manganese ions, high surface reactivity, and the like may be caused by the Jahn-Teller effect of $Mn^{3+}$ after lithium removal and the change of the $Li^+$ channel size. Therefore, by modifying the lithium manganese phosphate, the inventors obtain a positive electrode active material which can significantly reduce the dissolution of manganese ions and reduce the lattice change rate, and further has good cycling performance, high temperature storage performance and safety performance.

[Secondary Battery]

Secondary batteries, also known as rechargeable batteries or storage batteries, refer to batteries that, after being discharged, can activate active materials by charging for continuous use.

Generally, the secondary battery includes a positive electrode plate, a negative electrode plate, a separator and an electrolyte solution. During charging and discharging of the battery, active ions (such as lithium ions) are intercalated and deintercalated back and forth between the positive electrode plate and the negative electrode plate. The separator is arranged between the positive electrode plate and the negative electrode plate, and mainly plays a role in preventing a short circuit between the positive electrode and the negative electrode while allowing active ions to pass through. The electrolyte solution mainly plays a role in conducting active ions between the positive electrode plate and the negative electrode plate.

Figure 8A:
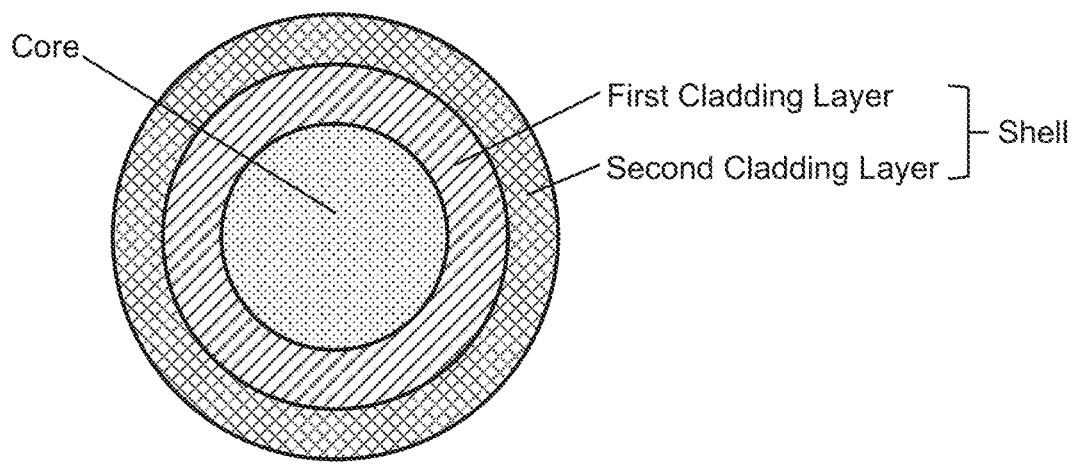
FIG. 8A is a schematic cross-sectional view of an example of a positive electrode active material according to some embodiments of the present application.
Figure 8B:
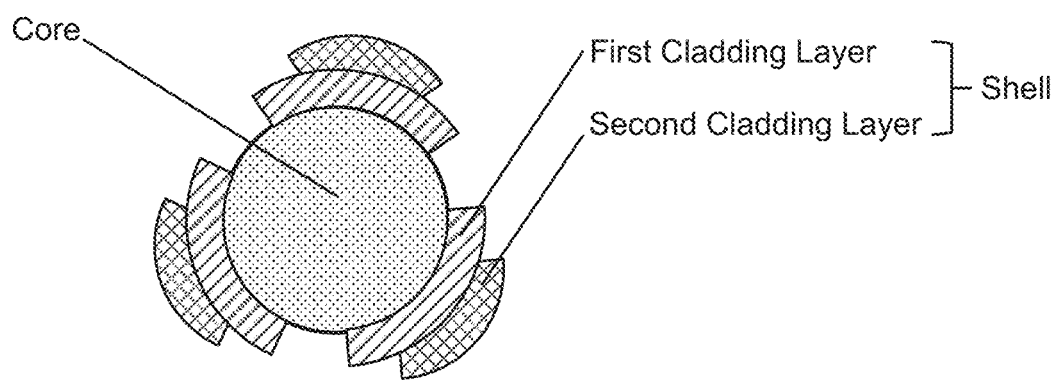
FIG. 8B is a schematic cross-sectional view of another example of a positive electrode active material according to some embodiments of the present application.

An embodiment of the present application provides a secondary battery, including a positive electrode plate and a non-aqueous electrolyte solution. A positive electrode active material includes an inner core and a shell cladding the inner core, as shown in FIG. 8A and FIG. 8B.

The non-aqueous electrolyte solution includes a first additive, and the first additive includes one or more compounds in a group consisting of a compound shown in Formula 1, a compound shown in Formula 2 and a compound shown in Formula 3:

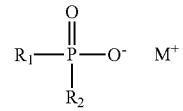

Formula 1

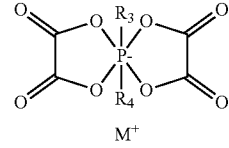

Formula 2

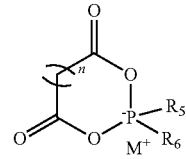

Formula 3

$R_1$ and $R_2$ independently represent any one of F, C1-C6 fluoroalkyl, C1-C6 alkyl, C1-C6 alkoxy, C2-C6 alkenyl, C2-C6 alkynyl and C6-C10 aryl, and at least one of $R_1$ and $R_2$ represents any one of F and C1-C6 fluoroalkyl;

$R_3$ and $R_4$ independently represent any one of F, C1-C6 fluoroalkyl, C1-C6 alkyl, C1-C6 alkoxy, C2-C6 alkenyl and C2-C6 alkynyl, and at least one of $R_3$ and $R_4$ represents any one of F and C1-C6 fluoroalkyl;

$R_5$ and $R_6$ independently represent any one of F, C1-C6 fluoroalkyl, C1-C6 alkyl, C1-C6 alkoxy, C2-C6 alkenyl, C2-C6 alkynyl, carbonyl, $O^-$, $=O$, $—^-BF_3$ and $—O^-BF_3$;

M in each chemical formula independently represents one of alkali metals and alkaline-earth metals; and n is 0, 1 or 2.

The positive electrode plate usually includes a positive electrode current collector and a positive electrode film layer arranged on at least one surface of the positive electrode current collector, where the positive electrode film layer includes a positive electrode active material.

As an example, the positive electrode current collector has two surfaces opposite in its own thickness direction, and the positive electrode film layer is arranged on either or both of the two opposite surfaces of the positive electrode current collector.

In some embodiments, the positive electrode current collector may be a metal foil or a composite current collector. For example, an aluminum foil may be used as the metal foil. The composite current collector may include a high molecular material substrate layer and a metal layer formed on at least one surface of the high molecular material substrate layer. The composite current collector may be formed by forming a metal material (aluminum, aluminum alloy, nickel, nickel alloy, titanium, titanium alloy, silver and silver alloy, and the like) on a high molecular material substrate (such as a polypropylene (PP), polyethylene terephthalate (PET), polybutylene terephthalate (PBT), polystyrene (PS), or polyethylene (PE) substrate).

The lithium manganese phosphate positive electrode active material of the present application is a core-shell structure with two cladding layers, where an inner core includes $Li_{1+x}Mn_{1-y}A_yP_{1-z}R_zO_4$. In the inner core, the doping of the element A at the position of manganese in the lithium manganese phosphate helps to reduce the lattice change rate of the lithium manganese phosphate in a lithium deintercalation process, increase the structural stability of the lithium manganese phosphate positive electrode material, greatly reduce the dissolution of manganese, and reduce the oxygen activity on a particle surface. The doping of the element R at the position of phosphorus helps to change the difficulty of changing the Mn—O bond length, thereby reducing the potential barrier of lithium ion migration, promoting lithium ion migration, and increasing the rate performance of the secondary battery.

The first cladding layer of the positive electrode active material of the present application includes pyrophosphate and phosphate. Due to a higher migration potential barrier (>1 eV) of transition metals in the pyrophosphate, the dissolution of transition metals can be effectively inhibited. Moreover, the phosphate has excellent lithium ion conductivity and can reduce the content of lithium impurities on a surface. In addition, since the second cladding layer is a carbon-containing layer, the conductivity and desolvation ability of $LiMnPO_4$ can be effectively improved. In addition, the "barrier" effect of the second cladding layer can further hinder the migration of manganese ions into the electrolyte solution, and reduce the corrosion of the electrolyte solution on the active material.

As a result, by specific element doping and surface cladding of lithium manganese phosphate, the present application can effectively inhibit the dissolution of manganese ions in a lithium deintercalation process and also promote the migration of lithium ions, thereby improving the rate performance of a battery cell, and increasing the cycling performance and high temperature performance of the secondary battery.

It should be noted that as shown in FIG. 1, in the present application, by comparing XRD spectra before and after $LiMnPO_4$ doping, it can be seen that the position of a main characteristic peak of the positive electrode active material of the present application is basically consistent with that before $LiMnPO_4$ doping. This indicates that the doped lithium manganese phosphate positive electrode active material has no impurity phase, and the improvement in the performance of the secondary battery is mainly caused by element doping, rather than impurity phases.

Furthermore, a phosphate type additive is introduced into the non-aqueous electrolyte solution to form $Li_xF_yPO_4$ on the surface of pyrophosphate in a charging process of a lithium-ion battery, so as to improve the ion conductivity of the lithium manganese phosphate positive electrode active material coated with pyrophosphate, thereby further improving the capacity utilization performance and rate performance of the secondary battery including the positive electrode active material.

In any of embodiments, in Formula 1, $R_1$ and $R_2$ independently represent any one of F, C1-C3 fluoroalkyl, C1-C3 alkyl, C1-C3 alkoxy, C2-C3 alkenyl, C2-C3 alkynyl, phenyl, benzyl and methylphenyl, and at least one of $R_1$ and $R_2$ represents any one of F and C1-C3 fluoroalkyl; optionally, $R_1$ and $R_2$ independently represent any one of F, C1-C3 alkyl and C1-C3 fluoroalkyl; and optionally, the C1-C3 fluoroalkyl is —$CF_3$, —$C_2F_5$, —$CH_2CF_3$ or —$CF_2CH_3$, and the C1-C3 alkyl is methyl or ethyl.

In any of embodiments, in Formula 2, $R_3$ and $R_4$ independently represent any one of F, C1-C3 fluoroalkyl, C1-C3 alkyl, C1-C3 alkoxy, C2-C3 alkenyl and C2-C3 alkynyl, and at least one of $R_3$ and $R_4$ represents any one of F and C1-C3 fluoroalkyl; and optionally, $R_3$ and $R_4$ independently represent any one of F and C1-C3 fluoroalkyl.

In any of embodiments, in Formula 3, $R_5$ and $R_6$ independently represent any one of F, C1-C3 fluoroalkyl, C1-C3 alkyl, C1-C3 alkoxy, C2-C6 alkenyl, C2-C6 alkynyl, carbonyl, O—, =O, —$BF_3$ and —O—$BF_3$; and optionally, $R_5$ and $R_6$ independently represent any one of F, fluoromethyl, methyl, O—, =O, —$BF_3$ and —O—$BF_3$, and n is 0 or 1.

In any of embodiments, M in each chemical formula independently represents one of Li, Na and K.

Optionally, the first additive used in the present application may be arbitrarily selected from each of the above chemical formulas. In some embodiments, the first additive includes one or more of the following compounds:

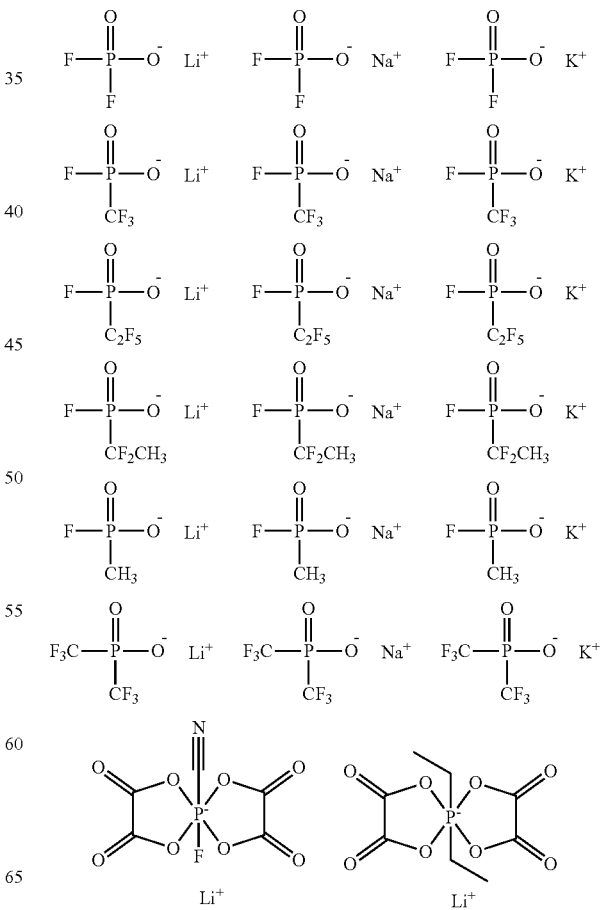

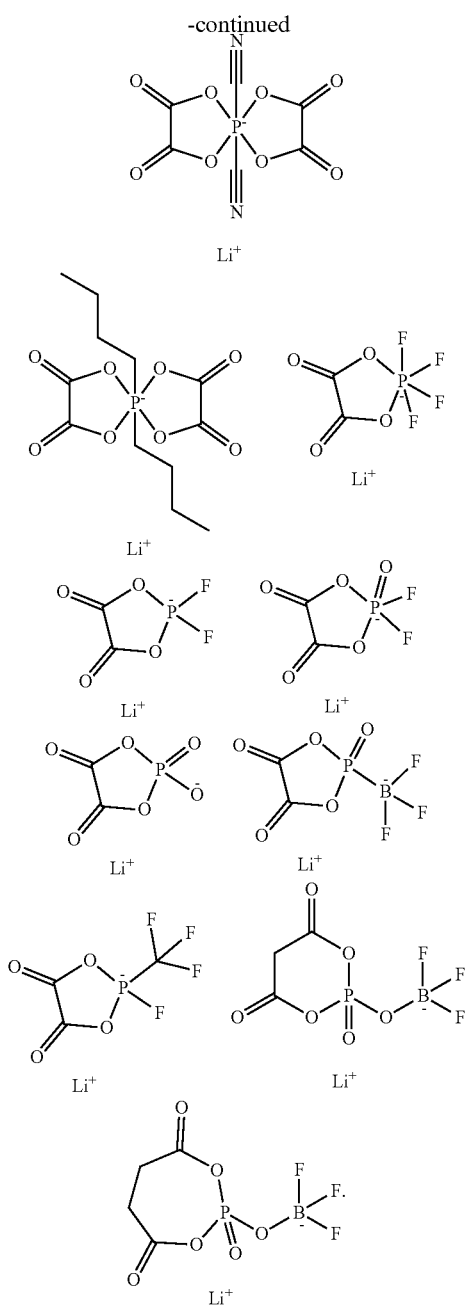

In some examples, the above first additive includes any one or more of the following compounds:

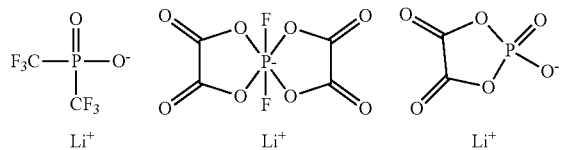

Each of the above first additives has higher efficiency in forming $Li_xF_yPO_4$ in the charging process, thus improving the ion conductivity of the positive electrode active material of the present application more efficiently.

In some embodiments, the above non-aqueous electrolyte solution further includes a second additive, and the second additive includes one or more of compounds in a group consisting of a cyclic carbonate compound containing unsaturated bonds, a halogen-substituted cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphite compound, a phosphate compound and a borate compound. The above second additive can improve the capacity, cycling performance and the like of the secondary battery according to its own performance. A corresponding second additive can be selected by those skilled in the art according to actual requirements.

In some embodiments, based on the total weight of the non-aqueous electrolyte solution, the content of the first additive is W1 wt %, and W1 is 0.01 to 20, and optionally 0.1 to 10 or 0.5 to 5; and/or the content of the second additive is W2 wt %, and W2 is 0.01 to 20, and optionally 0.1 to 10 or 0.3 to 5. The first additive with the above content not only avoids the increase in positive and negative electrode impedance caused by excessive first additive, but also ensures the high capacity and high rate performance of the secondary battery. As a result, when the mass proportion of the first additive in the non-aqueous electrolyte solution is within the above range, the first additive can significantly improve the ion conductivity of the positive electrode active material of the present application, and cannot deteriorate the positive and negative electrode impedance, thereby further improving the capacity utilization performance and rate performance of the secondary battery.

In some embodiments, W1/W2 is defined as M, and M is 0.001 to 20, and optionally 0.1 to 10. When W2/W1 is within the above range, the two can play a better synergistic role, thereby further improving the capacity utilization performance and cycling performance.

In some embodiments, the above non-aqueous electrolyte solution further includes an organic solvent, and the type of the organic solvent is not specifically limited and can be selected according to actual requirements. Optionally, the organic solvent includes one or more of a cyclic carbonate compound, a chain carbonate compound and a carboxylate compound, and further includes one or more components in a group consisting of dimethyl carbonate, diethyl carbonate, dipropyl carbonate, ethyl methyl carbonate, methyl propyl carbonate, ethyl propyl carbonate, ethylene carbonate, propylene carbonate, butene carbonate, gamma-butyrolactone, methyl formate, ethyl formate, methyl acetate, ethyl acetate, propyl acetate, methyl propionate, ethyl propionate, butyl propionate and tetrahydrofuran.

In some embodiments, the above non-aqueous electrolyte solution further includes an electrolyte salt. Optionally, the electrolyte salt includes one or more components in a group consisting of $LiN(C_xF_{2x+1}SO_2)(C_yF_{2y+1}SO_2)$, $Li(FSO_2)_2N$, $LiCF_3SO_3$, $LiPF_6$, $LiBF_4$, $LiAsF_6$, $LiClO_4$, LiBOB, LiDFOB and LiTFOP, x and y represent positive integers, optionally, x and y are independently 0, 1, 2 or 3, and the concentration range of the electrolyte salt in the non-aqueous electrolyte solution is 0.5 M to 2.5 M, and optionally 0.8 M to 2 M, which is favorable for smooth and quick migration of $Li^+$.

In some embodiments, based on the weight of the inner core, the cladding amount of the first cladding layer is C1 wt %, and C1 is greater than 0 and less than or equal to 7, and optionally 4 to 5.6. When the cladding amount of the first cladding layer is within the above range, it can further inhibit the dissolution of manganese ions and further promote the transport of lithium ions. The following situations can be effectively avoided: if the cladding amount of the first cladding layer is too small, it may lead to insufficient inhibition of pyrophosphate on the dissolution of manganese ions, and the improvement in lithium ion transport performance is also not significant; and if the cladding amount of the first cladding layer is too large, it may cause the cladding layer to be too thick, increase the battery impedance, and affect the dynamic performance of the battery.

In some embodiments, based on the weight of the inner core, the cladding amount of the second cladding layer is C2 wt %, and C2 is greater than 0 and less than or equal to 6, and optionally 3 to 5. On the one hand, the carbon-containing layer as the second cladding layer can play a "barrier" function to avoid the direct contact between the positive electrode active material and the electrolyte solution, thereby reducing the corrosion of the electrolyte solution on the active material, and increasing the safety performance of the battery at a high temperature. On the other hand, the carbon-containing layer has stronger electrical conductivity and can reduce the internal resistance of the battery, thereby improving the dynamic performance of the battery. However, due to lower gram capacity of carbon materials, when the amount of the second cladding layer is too large, it may reduce the overall gram capacity of the positive electrode active material. Therefore, when the cladding amount of the second cladding layer is within the above range, the dynamic performance and safety performance of the battery can be further improved without compromising the gram capacity of the positive electrode active material.

In some embodiments, the relational expression W1/(C1+C2) between the content W1 of the first additive and the cladding amount C1 of the first cladding layer as well as the cladding amount C2 of the second cladding layer is C, and C is 0.001 to 2, and optionally 0.01 to 1. When C is less than the above range, the film formation amount of the first additive on the surface of pyrophosphate is less, so the further improvement effect on the rate performance of the secondary battery is not significant; and when C is greater than the above range, excessive first additive will increase the positive and negative electrode impedance, which affects the capacity improvement and rate performance improvement effects of the secondary battery.

In some embodiments, optionally, the weight ratio of pyrophosphate to phosphate in the first cladding layer is 1:3 to 3:1, and optionally 1:3 to 1:1.

An appropriate ratio of pyrophosphate to phosphate is favorable for fully playing the synergistic role of the two. The following situations can be effectively avoided: if there is too much pyrophosphate and too little phosphate, it may lead to an increase in battery impedance; and if there is too much phosphate and too little pyrophosphate, the effect of inhibiting the dissolution of manganese ions is not significant.

In some embodiments, optionally, the interplanar spacing of phosphate in the first cladding layer is 0.345 to 0.358 nm, and an included angle between crystal orientations (111) is 24.25° to 26.45°; and the interplanar spacing of pyrophosphate in the first cladding layer is 0.293 to 0.326 nm, and an included angle between crystal orientations (111) is 26.41° to 32.57°.

When an interplanar spacing between phosphate and pyrophosphate in the first cladding layer and an included angle between crystal orientations (111) are within the above ranges, impurity phases in the cladding layer can be effectively avoided, thereby increasing the gram capacity, cycling performance and rate performance of the material.

In some embodiments, optionally, in the inner core, the ratio of y to 1−y is 1:10 to 10:1, and optionally 1:4 to 1:1. Here, y represents the sum of stoichiometric numbers of elements doped at the position of Mn. When the above conditions are satisfied, the energy density and cycling performance of the positive electrode active material can be further increased.

In some embodiments, optionally, in the inner core, the ratio of z to 1−z is 1:9 to 1:999, and optionally 1:499 to 1:249. Here, y represents the sum of stoichiometric numbers of elements doped at the position of P. When the above conditions are satisfied, the energy density and cycling performance of the positive electrode active material can be further increased.

In some embodiments, optionally, the crystallinity of pyrophosphate and phosphate is independently 10% to 100%, and optionally 50% to 100%.

In the first cladding layer of the positive electrode active material in the above embodiment, the pyrophosphate and phosphate with certain crystallinity are favorable for maintaining the structural stability of the first cladding layer and reducing lattice defects. On the one hand, this is favorable for fully playing a role of pyrophosphate in hindering the dissolution of manganese ions, and on the other hand, this is also favorable for reducing the content of lithium impurities on the surface by phosphate and reducing the valence state of surface oxygen, thereby reducing interfacial side reactions between the positive electrode active material and the non-aqueous electrolyte solution, reducing the consumption of the non-aqueous electrolyte solution, and improving the cycling performance and safety performance of the secondary battery.

It should be noted that in the present application, the crystallinity of pyrophosphate and phosphate can be adjusted, for example, by adjusting the process conditions in the sintering process, such as sintering temperature and sintering time. The crystallinity of pyrophosphate and phosphate may be measured by methods known in the art, such as an X-ray diffraction method, a density method, an infrared spectroscopy, a differential scanning calorimetry, and a nuclear magnetic resonance absorption method.

In some embodiments, optionally, A is selected from at least two of Fe, Ti, V, Ni, Co and Mg.

More than two of the above elements are simultaneously doped at the position of manganese in the lithium manganese phosphate positive electrode active material, which is favorable for enhancing the doping effect. On the one hand, the lattice change rate is further reduced, thereby inhibiting the dissolution of manganese, and reducing the consumption of the electrolyte solution and active lithium. On the other hand, it is favorable for further reducing the surface oxygen activity and reducing interfacial side reactions between the positive electrode active material and the electrolyte solution, thereby improving the cycling performance and high temperature storage performance of the battery.

In some embodiments, optionally, the Li/Mn antisite defect concentration of the positive electrode active material is 4% or less, and optionally 2% or less.

In the positive electrode active material of the above embodiment, the Li/Mn antisite defect refers to the exchange of the positions of $Li^+$ and $Mn^{2+}$ in the lattice of $LiMnPO_4$. Since a $Li^+$ transport channel is a one-dimensional channel, $Mn^{2+}$ is difficult to migrate in the $Li^+$ transport channel. Therefore, $Mn^{2+}$ with antisite defects will hinder the transport of $Li^+$. By controlling the Li/Mn antisite defect concentration at a low level, the gram capacity and rate performance of $LiMnPO_4$ can be improved. In the present application, the antisite defect concentration can be measured, for example, in accordance with JIS K 0131-1996.

In some embodiments, optionally, the lattice change rate of the positive electrode active material is 6% or less, and optionally 4% or less.

The lithium deintercalation process of $LiMnPO_4$ is a two-phase reaction. The interfacial stress between two phases is determined by the magnitude of the lattice change rate, where the smaller the lattice change rate, the smaller the interfacial stress, and the easier the transport of $Li^+$. Therefore, reducing the lattice change rate of the inner core facilitates the increase of the $Li^+$ transport ability, thereby further improving the rate performance of the secondary battery.

In some embodiments, optionally, the surface oxygen valence state of the positive electrode active material is −1.88 or less, and optionally −1.98 to −1.88.

This is because the higher the valence state of oxygen in a compound, the stronger its ability to obtain electrons, that is, the stronger its oxidizability. In the lithium manganese phosphate positive electrode active material of the present application, by controlling the surface valence state of oxygen at a lower level, the reactivity of the surface of the positive electrode material can be reduced, thereby reducing interfacial side reactions between the positive electrode material and the electrolyte solution, and further improving the cycling performance and high temperature storage performance of the secondary battery.

In some embodiments, optionally, the compacted density of the positive electrode active material at 3 tons (T) is 2.0 g/cm³ or more, and optionally 2.2 g/cm³ or more.

When the compacted density of the positive electrode active material is increased, the weight of the active material per unit volume increases, which is more beneficial to the increase of the volumetric energy density of the battery. In the present application, the compacted density can be measured, for example, in accordance with GB/T 24533-2009.

The positive electrode active material used for the secondary battery of the present application is prepared by the following preparation method. The preparation method includes the following steps:

an inner core material containing $Li_{1+x}Mn_{1-y}A_yP_{1-z}R_zO_4$ is provided; $MP_2O_7$ powder and an $XPO_4$ suspension containing a source of carbon are provided; and the inner core material and the $MP_2O_7$ powder are added to the $XPO_4$ suspension containing the source of carbon and mixed and sintered to obtain the positive electrode active material.

In some embodiments, the step of providing the inner core material includes the following steps: step (1): a source of manganese, a source of the element A and an acid are mixed and stirred in a container to obtain manganese salt particles doped with the element A; and step (2): the manganese salt particles doped with the element A, a source of lithium, a source of phosphorus and a source of the element R are mixed in a solvent to obtain a slurry, and the slurry is sintered under the protection of an inert gas atmosphere to obtain lithium manganese phosphate doped with the element A and the element R, where the lithium manganese phosphate doped with the element A and the element R is $Li_{1+x}Mn_{1-y}A_yP_{1-z}R_zO_4$, where x=−0.100-0.100, y=0.001-0.500, z=0.001-0.100; A is selected from one or more of Zn, Al, Na, K, Mg, Mo, W, Ti, V, Zr, Fe, Ni, Co, Ga, Sn, Sb, Nb and Ge, and optionally one or more of Fe, Ti, V, Ni, Co and Mg; and R is selected from one or more of B, Si, N and S.

Optionally, the above step (1) is performed at a temperature of 20-120° C., and optionally 25-80° C.; and/or the stirring process in step (1) is performed at 500-700 rpm for 60-420 min, and optionally 120-360 min.

In some examples, the source of the above element A is selected from one or more of the elemental substance, sulfates, halides, nitrates, organic acid salts, oxides and hydroxides of the element A; and/or the source of the element R is selected from one or more of the elemental substance, sulfates, halides, nitrates, organic acid salts, oxides and hydroxides of the element R, and inorganic acids of the element R.

In some examples, the $MP_2O_7$ powder is prepared by the following method: a source of the element M and a source of phosphorus are added to a solvent to obtain a mixture, the pH of the mixture is adjusted to 4-6, and the mixture is stirred to fully react and then dried and sintered to obtain the MP2O7 powder, where M is selected from one or more of Li, Fe, Ni, Mg, Co, Cu, Zn, Ti, Ag, Zr, Nb and Al. Optionally, the above drying step is performed for 4-8 h at 100-300° C., and optionally 150-200° C.; and the above sintering step is performed for 4-10 h in an inert gas atmosphere at 500-800° C., and optionally 650-800° C.

In some examples, in the above cladding step, the sintering temperature is 500-800° C., and the sintering time is 4-10 h.

In some embodiments, the positive electrode film layer may further include other positive electrode active materials for secondary batteries known in the art. As an example, the positive electrode active material may include at least one of the following materials: a lithium-containing phosphate with an olivine structure, a lithium transition metal oxide, and respective modified compounds. However, the present application is not limited to these materials, and other conventional materials used as positive electrode active materials for secondary batteries may also be used. It is possible to use only one of these positive electrode active materials alone, or to use more than two of these positive electrode active materials in combination. Examples of the lithium transition metal oxide may include, but are not limited to, at least one of a lithium nickel oxide (such as $LiNiO_2$), a lithium manganese oxide (such as $LiMnO_2$ or $LiMn_2O_4$), a lithium nickel cobalt oxide, a lithium manganese cobalt oxide, a lithium nickel manganese oxide, and modified compounds thereof. Examples of the lithium-containing phosphate with an olivine structure may include, but are not limited to, at least one of a lithium iron phosphate (such as $LiFePO_4$ (also abbreviated as LFP)), a lithium iron phosphate-carbon composite, a lithium manganese phosphate (such as $LiMnPO_4$), a lithium manganese phosphate-carbon composite, a lithium iron manganese phosphate, and a lithium iron manganese phosphate-carbon composite.

In some embodiments, the positive electrode film layer further optionally includes a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorine-containing acrylate resin.

In some embodiments, the positive electrode film layer further optionally includes a conductive agent. As an example, the conductive agent may include at least one of superconducting carbon, acetylene black, carbon black, Ketjen black, a carbon dot, a carbon nanotube, graphene, and carbon nanofiber.

In some embodiments, the positive electrode plate can be prepared by dispersing the above components for preparing the positive electrode plate, for example, the positive electrode active material, the conductive agent, the binder and any other components in a solvent (for example, N-methyl pyrrolidone) to form a positive electrode slurry; and coating the positive electrode slurry on a positive electrode current collector, followed by oven drying, cold pressing and other procedures, to obtain the positive electrode plate.

[Negative Electrode Plate]

The negative electrode plate includes a negative electrode current collector and a negative electrode film layer arranged on at least one surface of the negative electrode current collector, and the negative electrode film layer includes a negative electrode active material.

As an example, the negative electrode current collector has two surfaces opposite in its own thickness direction, and the negative electrode film layer is arranged on either or both of the two opposite surfaces of the negative electrode current collector.

In some embodiments, the negative electrode current collector may be a metal foil or a composite current collector. For example, a copper foil may be used as the metal foil. The composite current collector may include a high molecular material substrate layer and a metal layer formed on at least one surface of the high molecular material substrate. The composite current collector may be formed by forming a metal material (copper, copper alloy, nickel, nickel alloy, titanium, titanium alloy, silver and silver alloy, and the like) on a high molecular material substrate (such as a polypropylene (PP), polyethylene terephthalate (PET), polybutylene terephthalate (PBT), polystyrene (PS), or polyethylene (PE) substrate).

In some embodiments, a negative electrode active material for a battery well known in the art may be used as the negative electrode active material. As an example, the negative electrode active material may include at least one of the following materials: artificial graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, the present application is not limited to these materials, and other conventional materials used as negative electrode active materials for batteries may also be used. It is possible to use only one of these negative electrode active materials alone, or to use more than two of these negative electrode active materials in combination.

In some embodiments, the negative electrode film layer further optionally includes a binder. As an example, the binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer further optionally includes a conductive agent. As an example, the conductive agent may be selected from at least one of superconducting carbon, acetylene black, carbon black, Ketjen black, a carbon dot, a carbon nanotube, graphene, and carbon nanofiber.

In some embodiments, the negative electrode film layer further optionally includes other auxiliaries, for example, a thickener (such as sodium carboxymethyl cellulose (CMC-Na)), and the like.

In some embodiments, the negative electrode plate can be prepared by dispersing the above components for preparing the negative electrode plate, for example, the negative electrode active material, the conductive agent, the binder and any other components in a solvent (for example, deionized water) to form a negative electrode slurry; and coating the negative electrode slurry on a negative electrode current collector, followed by oven drying, cold pressing and other procedures, to obtain the negative electrode plate.

[Separator]

In some embodiments, the secondary battery further includes a separator. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multi-layer composite film, the material of each layer may be the same or different, which is not particularly limited.

In some embodiments, the positive electrode plate, the negative electrode plate and the separator may be made into an electrode assembly by a winding process or a stacking process.

In some embodiments, the secondary battery may include an outer package. The outer package can be configured to encapsulate the above electrode assembly and electrolyte.

In some embodiments, the outer package of the secondary battery may be a hard shell, such as a hard plastic shell, an aluminum shell, or a steel shell. The outer package of the secondary battery may also be a soft package, such as a bag-type soft package. The material of the soft package may be plastic, and as plastic, polypropylene, polybutylene terephthalate, polybutylene succinate, and the like may be enumerated.

Figure 2:
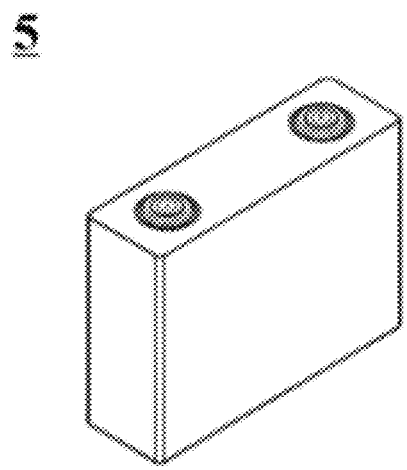
FIG. 2 is a schematic view of a secondary battery according to an embodiment of the present application.

The present application has no particular limitation on the shape of the secondary battery, which may be cylindrical, square or any other shapes. For example, FIG. 2 shows an example of a secondary battery 5 having a square structure.

Figure 3:
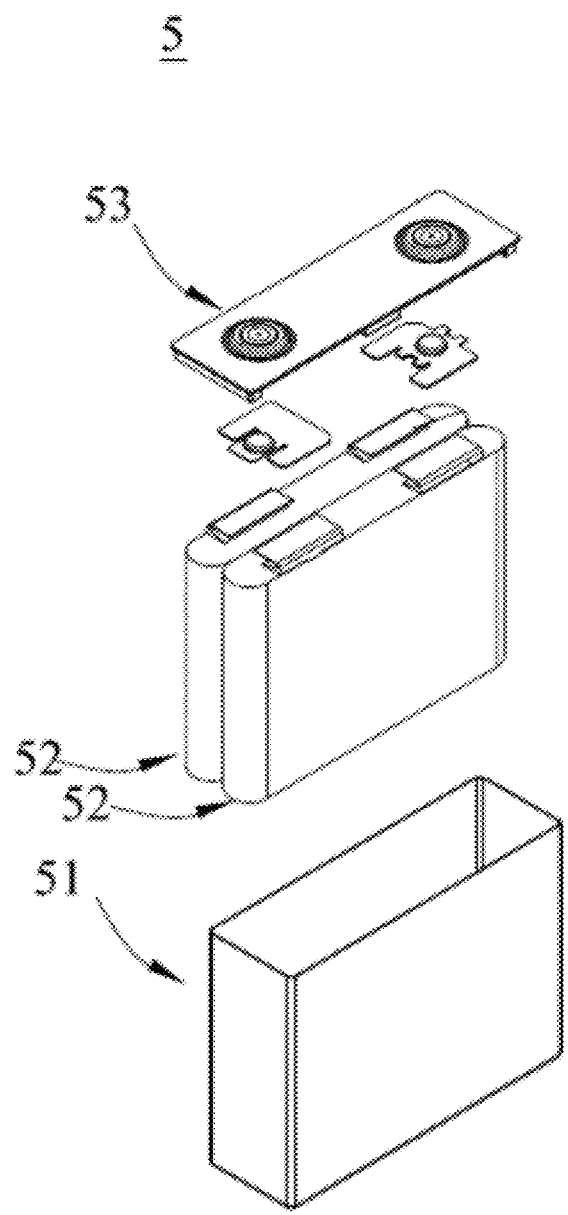
FIG. 3 is an exploded view of the secondary battery according to an embodiment of the present application shown in FIG. 2.

In some embodiments, referring to FIG. 3, the outer package may include a case 51 and a cover plate 53. The case 51 may include a bottom plate and a side plate connected to the bottom plate, and the bottom plate and the side plate are enclosed to form an accommodating cavity. The case 51 has an opening that communicates with the accommodating cavity, and the cover plate 53 may cover the opening to close the accommodating cavity. The positive electrode plate, the negative electrode plate and the separator may be formed into an electrode assembly 52 by a winding process or a stacking process. The electrode assembly 52 is encapsulated in the accommodating cavity. The electrolyte solution impregnates the electrode assembly 52. The number of electrode assemblies 52 contained in the secondary battery 5 may be one or more, which may be selected by those skilled in the art according to specific actual requirements.

In some embodiments, secondary batteries may be assembled into a battery module, the number of the secondary batteries contained in the battery module may be one or more, and the specific number may be selected by those skilled in the art according to the application and capacity of the battery module.

Figure 4:
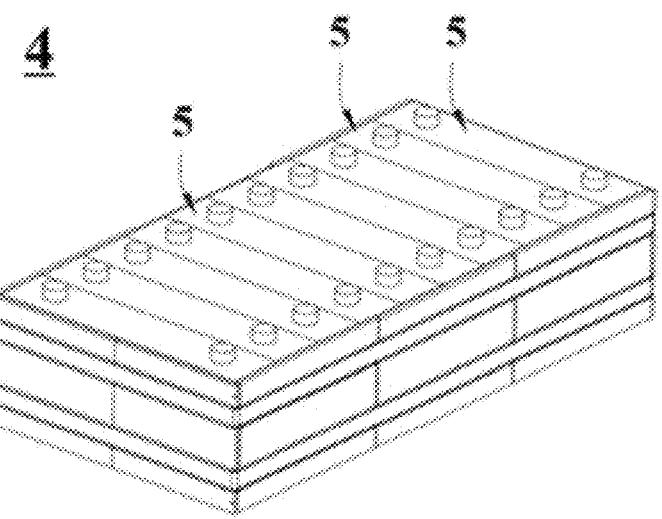
FIG. 4 is a schematic view of a battery module according to an embodiment of the present application.

FIG. 4 shows an example of a battery module 4. Referring to FIG. 4, in the battery module 4, a plurality of secondary batteries 5 may be sequentially arranged along a length direction of the battery module 4. Of course, a plurality of secondary batteries 5 may also be arranged in any other ways. The plurality of secondary batteries 5 may further be fixed by fasteners.

Optionally, the battery module 4 may further include a shell having an accommodating space, and the plurality of secondary batteries 5 are accommodated in the accommodating space.

In some embodiments, the above battery modules may further be assembled into a battery pack, the number of the battery modules contained in the battery pack may be one or more, and the specific number may be selected by those skilled in the art according to the application and capacity of the battery pack.

Figure 5:
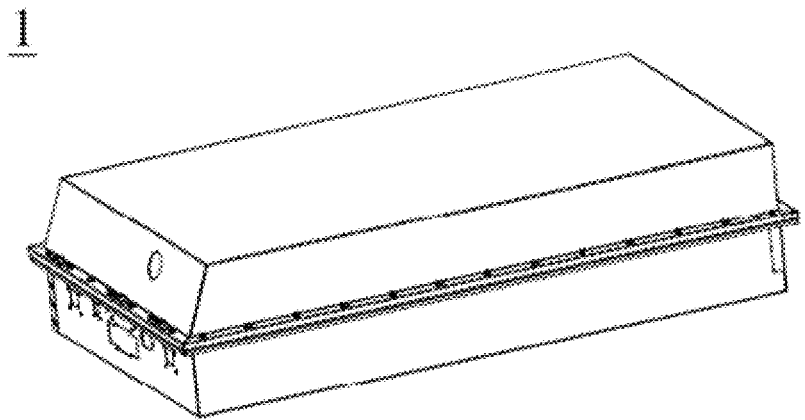
FIG. 5 is a schematic view of a battery pack according to an embodiment of the present application.
Figure 6:
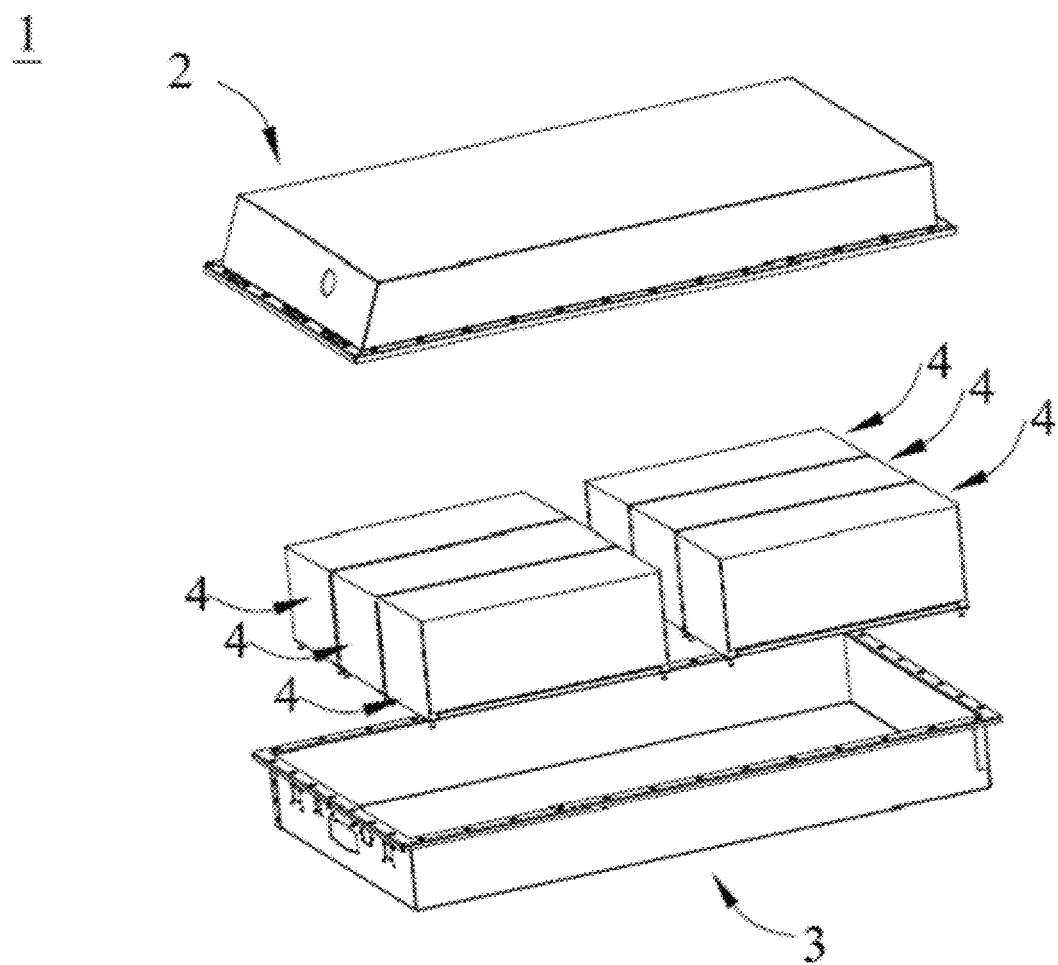
FIG. 6 is an exploded view of the battery pack according to an embodiment of the present application shown in FIG. 5.

FIG. 5 and FIG. 6 show an example of a battery pack 1. Referring to FIG. 5 and FIG. 6, the battery pack 1 may include a battery box and a plurality of battery modules 4 arranged in the battery box. The battery box includes an upper box 2 and a lower box 3, and the upper box 2 may cover the lower box 3 to form a closed space for accommodating the battery modules 4. The plurality of battery modules 4 may be arranged in the battery box in any manner.

In addition, the present application further provides an electrical apparatus. The electrical apparatus includes at least one of the secondary battery, battery module and battery pack provided in the present application. The secondary battery, battery module, or battery pack may be used as a power source for the electrical apparatus, and may also be used as an energy storage unit for the electrical apparatus. The electrical apparatus may include, but is not limited to, a mobile device (such as a mobile phone, a laptop, or the like), an electric vehicle (such as an all-electric vehicle, a hybrid electric vehicle, a plug-in hybrid electric vehicle, an electric bicycle, an electric scooter, an electric golf cart, an electric truck, or the like), an electric train, a ship, a satellite, an energy storage system, and the like.

For the electrical apparatus, the secondary battery, the battery module, or the battery pack can be selected according to the requirements during use.

Figure 7:
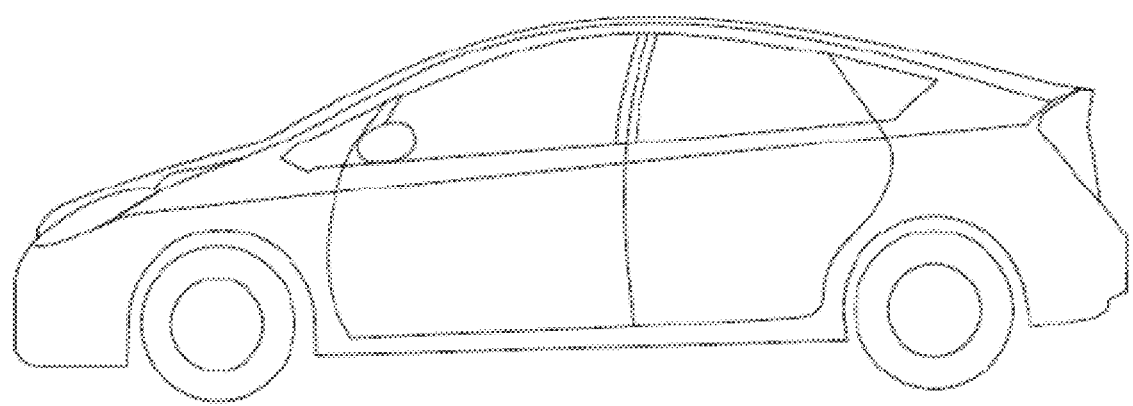
FIG. 7 is a schematic view of an electrical apparatus in which a secondary battery is used as a power source according to an embodiment of the present application.

FIG. 7 shows an example of an electrical apparatus. The electrical apparatus is an all-electric vehicle, a hybrid electric vehicle, a plug-in hybrid electric vehicle, or the like. In order to meet the requirements of the electrical apparatus for high power and high energy density of a secondary battery, a battery pack or a battery module may be used.

EXAMPLES

Examples of the present application will be described hereinafter. The examples described below are exemplary and only used to explain the present application, and are not to be construed as limiting the present application. Where specific techniques or conditions are not specified in the examples, the techniques or conditions described in the literatures of the art or the product specifications are followed. All of the used reagents or instruments which are not specified with manufacturers are conventional commercially-available products.

The first additive is selected from the following compounds:

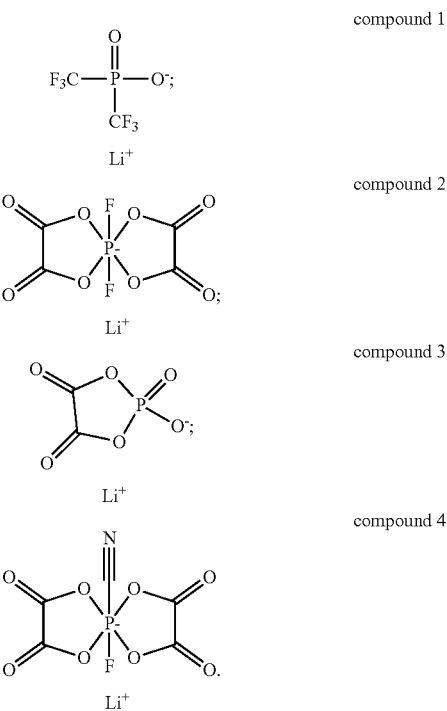

The second additive is selected from the following compounds:

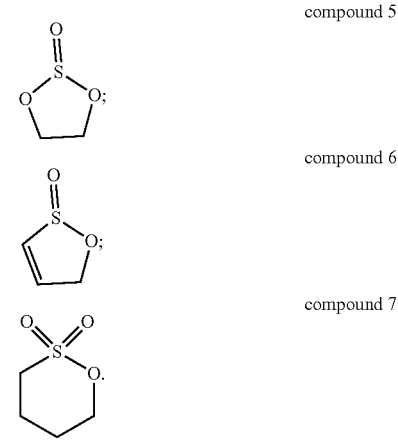

Example 1-1

[Preparation of Double-Clad Lithium Manganese Phosphate Positive Electrode Active Material]

(1) Preparation of Co-Doped Lithium Manganese Phosphate Inner Core

Preparation of Fe, Co and V co-doped manganese oxalate: 689.5 g of manganese carbonate (measured by $MnCO_3$, the same below), 455.2 g of ferrous carbonate (measured by $FeCO_3$, the same below), 4.6 g of cobalt sulfate (measured by $CoSO_4$, the same below) and 4.9 g of vanadium dichloride (measured by $VCl_2$, the same below) were fully mixed in a mixer for 6 h. The mixture was transferred into a reactor, and 5 l of deionized water and 1260.6 g of oxalic acid dihydrate (measured by $C_2H_2O_4 \cdot 2H_2O$, the same below) were added. The reactor was heated to 80° C., and the mixture was stirred for 6 h at a rotational speed of 600 rpm until the reaction ends (no bubbles were generated) to obtain a Fe, Co, V and S co-doped manganese oxalate suspension. Then, the suspension was filtered, and the filter cake was oven-dried at 120° C. and then ground to obtain Fe, Co and V co-doped manganese oxalate dihydrate particles with a median particle diameter Dv50 of 100 nm.

Preparation of Fe, Co, V and S co-doped lithium manganese phosphate: the manganese oxalate dihydrate particles (1793.4 g) obtained in the previous step, 369.0 g of lithium carbonate (measured by $Li_2CO_3$, the same below), 1.6 g of dilute sulphuric acid with a concentration of 60% (measured by $H_2SO_4$ with a concentration of 60%, the same below) and 1148.9 g of ammonium dihydrogen phosphate (measured by $NH_4H_2PO_4$, the same below) were added to 20 l of deionized water, and the mixture was stirred for 10 h and mixed evenly to obtain a slurry. The slurry was transferred into a spray drying device for spray drying granulation, and dried for 4 h at a set drying temperature of 250° C. to obtain powder. In a protective atmosphere of nitrogen (90 vol %) and hydrogen (10 vol %), the above powder was sintered for 4 h at 700° C. to obtain 1572.1 g of Fe, Co, V and S co-doped lithium manganese phosphate.

(2) Preparation of Lithium Iron Pyrophosphate and Lithium Iron Phosphate

Preparation of lithium iron pyrophosphate powder: 4.77 g of lithium carbonate, 7.47 g of ferrous carbonate, 14.84 g of ammonium dihydrogen phosphate and 1.3 g of oxalic acid dihydrate were dissolved in 50 ml of deionized water. The pH of the mixture was 5, and the mixture was stirred for 2 h to enable the reaction mixture to fully react. Then, the solution after reaction was heated to 80° C. and the temperature was maintained for 4 h to obtain a suspension containing $Li_2FeP_2O_7$, and the suspension was filtered, washed with deionized water and dried for 4 h at 120° C. to obtain powder. The powder was sintered for 8 h at 650° C. in a nitrogen atmosphere, naturally cooled to a room temperature and then ground to obtain $Li_2FeP_2O_7$ powder.

Preparation of lithium iron phosphate suspension: 11.1 g of lithium carbonate, 34.8 g of ferrous carbonate, 34.5 g of ammonium dihydrogen phosphate, 1.3 g of oxalic acid dihydrate and 74.6 g of sucrose (measured by $C_{12}H_{22}O_{11}$, the same below) were dissolved in 150 ml of deionized water to obtain a mixture, and then, the mixture was stirred for 6 h to enable the above mixture to fully react. Then, the solution after reaction was heated to 120° C., and the temperature was maintained for 6 h to obtain a suspension containing $LiFePO_4$.

(3) Cladding 1572.1 g of the above Fe, Co, V and S co-doped lithium manganese phosphate and 15.72 g of the above lithium iron pyrophosphate ($Li_2FeP_2O_7$) powder were added to the lithium iron phosphate ($LiFePO_4$) suspension obtained in the previous step and stirred and mixed evenly, and then, the mixture was transferred into a vacuum oven and dried for 6 h at 150° C. Then, the obtained product was dispersed by sanding. After dispersion, the obtained product was sintered for 6 h at 700° C. in a nitrogen atmosphere to obtain a target product double-clad lithium manganese phosphate.

[Preparation of Positive Electrode Plate]

The above prepared double-clad lithium manganese phosphate positive electrode active material, a conductive agent acetylene black and a binder polyvinylidene fluoride (PVDF) were added to N-methyl pyrrolidone (NMP) according to a weight ratio of 92:2.5:5.5, and stirred and mixed evenly to obtain a positive electrode slurry. Then, the positive electrode slurry was evenly coated on an aluminum foil in an amount of 0.280 g/1540.25 mm², followed by oven drying, cold pressing and slitting, to obtain a positive electrode plate.

[Preparation of Negative Electrode Plate]

A negative electrode active material artificial graphite, hard carbon, a conductive agent acetylene black, a binder styrene butadiene rubber (SBR) and a thickener sodium carboxymethyl cellulose (CMC-Na) were dissolved in a solvent deionized water in a weight ratio of 90:5:2:2:1 and stirred and mixed evenly to prepare a negative electrode slurry. The negative electrode slurry was evenly coated on a copper foil that is a negative electrode current collector in an amount of 0.117 g/1540.25 mm², followed by oven drying, cold pressing and slitting, to obtain a negative electrode plate.

[Preparation of Electrolyte Solution]

In an argon atmosphere glove box ($H_2O<0.1$ ppm, $O_2<0.1$ ppm), as an organic solvent, ethylene carbonate (EC)/ethyl methyl carbonate (EMC) were mixed evenly in a volume ratio of 3/7, and a compound 1 (as a first additive, with a mass content of 2% in the electrolyte solution), a compound 5 (as a second additive, with a mass content of 1% in the electrolyte solution), and $LiPF_6$ (as an electrolyte salt, with a mass content of 1% in the electrolyte solution) were added to the mixture and stirred evenly to obtain the electrolyte solution.

[Separator]

A commercially available PP-PE copolymer microporous film with a thickness of 20 μm and an average pore size of 80 nm (from Zoco Electronic Technology Co., Ltd., model 20) was used.

[Preparation of Full Battery]

The above obtained positive electrode plate, separator and negative electrode plate were stacked in sequence, so that the separator was located between the positive electrode plate and the negative electrode plate for separation, and a bare battery cell was obtained by winding. The bare battery cell was placed in an outer package, injected with the above electrolyte solution and encapsulated to obtain a full battery (also referred to as "full battery" below).

[Preparation of Button Battery]

The above prepared double-clad lithium manganese phosphate positive electrode active material, PVDF and acetylene black were added to NMP in a weight ratio of 90:5:5, and stirred in a drying room to prepare a slurry. The above slurry was coated on an aluminum foil, and the aluminum foil was dried and cold-pressed to prepare a positive electrode plate. The coating amount was 0.2 g/cm², and the compacted density was 2.0 g/cm³.

A lithium plate was used as a negative electrode, and the lithium plate, the above electrolyte solution and the above prepared positive electrode plate were together assembled into a button battery (also referred to as "button battery" below) in a button battery box.

Examples 1-2 to 1-6

In the preparation process of the co-doped lithium manganese phosphate inner core, except that vanadium dichloride and cobalt sulfate were not used, and 463.4 g of ferrous carbonate, 1.6 g of dilute sulphuric acid with a concentration of 60%, 1148.9 g of ammonium dihydrogen phosphate and 369.0 g of lithium carbonate were used, the preparation conditions of the lithium manganese phosphate inner core in Examples 1-2 to 1-6 were the same as those in Example 1-1.

In addition, in the preparation process of lithium iron pyrophosphate and lithium iron phosphate and the process of cladding the first cladding layer and the second cladding layer, except that the used raw materials were adjusted correspondingly according to the ratio of the cladding amount shown in Table 1 to the cladding amount corresponding to Example 1-1 so that the amounts of $Li_2FeP_2O_7$/$LiFePO_4$ in Examples 1-2 to 1-6 were respectively 12.6 g/37.7 g, 15.7 g/47.1 g, 18.8 g/56.5 g, 22.0/66.0 g and 25.1 g/75.4 g, and the amount of sucrose in Examples 1-2 to 1-6 was 37.3 g, other conditions were the same as those in Example 1-1.

Examples 1-7 to 1-10

Except that the amounts of sucrose were respectively 74.6 g, 149.1 g, 186.4 g and 223.7 g so that the cladding amounts corresponding to the carbon layer as the second cladding layer were respectively 31.4 g, 62.9 g, 78.6 g and 94.3 g, the conditions in Examples 1-7 to 1-10 were the same as those in Example 1-3.

Examples 1-11 to 1-14

Except that in the preparation process of lithium iron pyrophosphate and lithium iron phosphate, the amounts of various raw materials were adjusted correspondingly according to the cladding amount shown in Table 1 so that the amounts of $Li_2FeP_2O_7$/$LiFePO_4$ were respectively 23.6 g/39.3 g, 31.4 g/31.4 g, 39.3 g/23.6 g and 47.2 g/15.7 g, the conditions in Examples 1-11 to 1-14 were the same as those in Example 1-7.

Example 1-15

Except that in the preparation process of the co-doped lithium manganese phosphate inner core, ferrous carbonate was replaced with 492.80 g of $ZnCO_3$, the conditions in Example 1-15 were the same as those in Example 1-14.

Examples 1-16 to 1-18

Except that in Example 1-16, in the preparation process of the co-doped lithium manganese phosphate inner core, ferrous carbonate was replaced with 466.4 g of $NiCO_3$, 5.0 g of zinc carbonate and 7.2 g of titanium sulfate; in Example 1-17, in the preparation process of the co-doped lithium manganese phosphate inner core, 455.2 g of ferrous carbonate and 8.5 g of vanadium dichloride were used; and in Example 1-18, in the preparation process of the co-doped lithium manganese phosphate inner core, 455.2 g of ferrous carbonate, 4.9 g of vanadium dichloride and 2.5 g of magnesium carbonate were used, the conditions in Examples 1-17 to 1-19 were the same as those in Example 1-7.

Examples 1-19 to 1-20

Except that in Example 1-19, in the preparation process of the co-doped lithium manganese phosphate inner core, 369.4 g of lithium carbonate was used, and dilute sulphuric acid was replaced with 1.05 g of dilute nitric acid with a concentration of 60%; and in Example 1-20, in the preparation process of the co-doped lithium manganese phosphate inner core, 369.7 g of lithium carbonate was used, and dilute sulphuric acid was replaced with 0.78 g of siliceous acid, the conditions in Examples 1-19 to 1-20 were the same as those in Example 1-18.

Examples 1-21 to 1-22

Except that in Example 1-21, in the preparation process of the co-doped lithium manganese phosphate inner core, 632.0 g of manganese carbonate, 463.30 g of ferrous carbonate, 30.5 g of vanadium dichloride, 21.0 g of magnesium carbonate and 0.78 g of siliceous acid were used; and in Example 1-22, in the preparation process of the co-doped lithium manganese phosphate inner core, 746.9 g of manganese carbonate, 289.6 g of ferrous carbonate, 60.9 g of vanadium dichloride, 42.1 g of magnesium carbonate and 0.78 g of siliceous acid were used, the conditions in Examples 1-21 to 1-22 were the same as those in Example 1-20.

Examples 1-23 to 1-24

Except that in Example 1-23, in the preparation process of the co-doped lithium manganese phosphate inner core, 804.6 g of manganese carbonate, 231.7 g of ferrous carbonate, 1156.2 g of ammonium dihydrogen phosphate, 1.2 g of boric acid with a mass fraction of 99.5% and 370.8 g of lithium carbonate were used; and in Example 1-24, in the preparation process of the co-doped lithium manganese phosphate inner core, 862.1 g of manganese carbonate, 173.8 g of ferrous carbonate, 1155.1 g of ammonium dihydrogen phosphate, 1.86 g of boric acid with a mass fraction of 99.5% and 371.6 g of lithium carbonate were used, the conditions in Examples 1-23 to 1-24 were the same as those in Example 1-22.

Example 1-25

Except that in Example 1-25, in the preparation process of the co-doped lithium manganese phosphate inner core, 370.1 g of lithium carbonate, 1.56 g of siliceous acid and 1147.7 g of ammonium dihydrogen phosphate were used, the conditions in Example 1-25 were the same as those in Example 1-20.

Example 1-26

Except that in Example 1-26, in the preparation process of the co-doped lithium manganese phosphate inner core, 368.3 g of lithium carbonate, 4.9 g of dilute sulphuric acid with a mass fraction of 60%, 919.6 g of manganese carbonate, 224.8 g of ferrous carbonate, 3.7 g of vanadium dichloride, 2.5 g of magnesium carbonate and 1146.8 g of ammonium dihydrogen phosphate were used, the conditions in Example 1-26 were the same as those in Example 1-20.

Example 1-27

Except that in Example 1-27, in the preparation process of the co-doped lithium manganese phosphate inner core, 367.9 g of lithium carbonate, 6.5 g of dilute sulphuric acid with a concentration of 60% and 1145.4 g of ammonium dihydrogen phosphate were used, the conditions in Example 1-27 were the same as those in Example 1-20.

Examples 1-28 to 1-33

Except that in Examples 1-28 to 1-33, in the preparation process of the co-doped lithium manganese phosphate inner core, 1034.5 g of manganese carbonate, 108.9 g of ferrous carbonate, 3.7 g of vanadium dichloride and 2.5 g of magnesium carbonate were used, the usage amounts of lithium carbonate were respectively 367.6 g, 367.2 g, 366.8 g, 366.4 g, 366.0 g and 332.4 g, the usage amounts of ammonium dihydrogen phosphate were respectively 1144.5 g, 1143.4 g, 1142.2 g, 1141.1 g, 1139.9 g and 1138.8 g, and the usage amounts of dilute sulphuric acid with a concentration of 60% were respectively 8.2 g, 9.8 g, 11.4 g, 13.1 g, 14.7 g and 16.3 g, the conditions in Examples 1-28 to 1-33 were the same as those in Example 1-20.

Examples 2-1 to 2-4

Example 2-1

Except that in the preparation process of lithium iron pyrophosphate ($Li_2FeP_2O_7$), in the powder sintering step, the sintering temperature was 550° C. and the sintering time was 1 h to control the crystallinity of $Li_2FeP_2O_7$ to be 30%; and in the preparation process of lithium iron phosphate ($LiFePO_4$), in the cladding and sintering step, the sintering temperature was 650° C. and the sintering time was 2 h to control the crystallinity of $LiFePO_4$ to be 30%, other conditions were the same as those in Example 1-1.

Example 2-2

Except that in the preparation process of lithium iron pyrophosphate ($Li_2FeP_2O_7$), in the powder sintering step, the sintering temperature was 550° C. and the sintering time was 2 h to control the crystallinity of $Li_2FeP_2O_7$ to be 50%; and in the preparation process of lithium iron phosphate ($LiFePO_4$), in the cladding and sintering step, the sintering temperature was 650° C. and the sintering time was 3 h to control the crystallinity of $LiFePO_4$ to be 50%, other conditions were the same as those in Example 1-1.

Example 2-3

Except that in the preparation process of lithium iron pyrophosphate ($Li_2FeP_2O_7$), in the powder sintering step, the sintering temperature was 600° C. and the sintering time was 3 h to control the crystallinity of $Li_2FeP_2O_7$ to be 70%; and in the preparation process of lithium iron phosphate ($LiFePO_4$), in the cladding and sintering step, the sintering temperature was 650° C. and the sintering time was 4 h to control the crystallinity of $LiFePO_4$ to be 70%, other conditions were the same as those in Example 1-1.

Example 2-4

Except that in the preparation process of lithium iron pyrophosphate ($Li_2FeP_2O_7$), in the powder sintering step, the sintering temperature was 650° C. and the sintering time was 4 h to control the crystallinity of $Li_2FeP_2O_7$ to be 100%; and in the preparation process of lithium iron phosphate ($LiFePO_4$), in the cladding and sintering step, the sintering temperature was 700° C. and the sintering time was 6 h to control the crystallinity of $LiFePO_4$ to be 100%, other conditions were the same as those in Example 1-1.

Examples 3-1 to 3-12

Except that in the preparation process of Fe, Co and V co-doped manganese oxalate particles, in Example 3-1, the heating temperature/stirring time in the reactor were respectively 60° C./120 min; in Example 3-2, the heating temperature/stirring time in the reactor were respectively 70° C./120 min; in Example 3-3, the heating temperature/stirring time in the reactor were respectively 80° C./120 min; in Example 3-4, the heating temperature/stirring time in the reactor were respectively 90° C./120 min; in Example 3-5, the heating temperature/stirring time in the reactor were respectively 100° C./120 min; in Example 3-6, the heating temperature/stirring time in the reactor were respectively 110° C./120 min; in Example 3-7, the heating temperature/stirring time in the reactor were respectively 120° C./120 min; in Example 3-8, the heating temperature/stirring time in the reactor were respectively 130° C./120 min; in Example 3-9, the heating temperature/stirring time in the reactor were respectively 100° C./60 min; in Example 3-10, the heating temperature/stirring time in the reactor were respectively 100° C./90 min; in Example 3-11, the heating temperature/stirring time in the reactor were respectively 100° C./150 min; and in Example 3-12, the heating temperature/stirring time in the reactor were respectively 100° C./180 min, other conditions in Examples 3-1 to 3-12 were the same as those in Example 1-1.

Examples 4-1 to 4-7

Examples 4-1 to 4-4: Except that in the preparation process of lithium iron pyrophosphate ($Li_2FeP_2O_7$), in the drying step, the drying temperature/drying time were respectively 100° C./4 h, 150° C./6 h, 200° C./6 h and 200° C./6 h; and in the preparation process of lithium iron pyrophosphate ($Li_2FeP_2O_7$), in the sintering step, the sintering temperature and sintering time were respectively 700° C./6 h, 700° C./6 h, 700° C./6 h and 600° C./6 h, other conditions were the same as those in example 1-7.

Examples 4-5 to 4-7: Except that in the cladding process, in the drying step, the drying temperature/drying time were respectively 150° C./6 h, 150° C./6 h and 150° C./6 h; and in the cladding process, in the sintering step, the sintering temperature and sintering time were respectively 600° C./4 h, 600° C./6 h and 800° C./8 h, other conditions were the same as those in example 1-12.

Comparative Example 1

Preparation of manganese oxalate: 1149.3 g of manganese carbonate was added to a reactor, and 5 l of deionized water and 1260.6 g of oxalic acid dihydrate (measured by $C_2H_2O_4 \cdot 2H_2O$, the same below) were added. The reactor was heated to 80° C., and the mixture was stirred for 6 h at a rotational speed of 600 rpm until the reaction ends (no bubbles were generated) to obtain a manganese oxalate suspension. Then, the suspension was filtered, and the filter cake was oven-dried at 120° C. and then ground to obtain manganese oxalate dihydrate particles with a median particle diameter Dv50 of 100 nm.

Preparation of carbon-clad lithium manganese phosphate: 1789.6 g of the above obtained manganese oxalate dihydrate particles, 369.4 g of lithium carbonate (measured by $Li_2CO_3$, the same below), 1150.1 g of ammonium dihydrogen phosphate (measured by $NH_4H_2PO_4$, the same below) and 31 g of sucrose (measured by $C_{12}H_{22}O_{11}$, the same below) were taken and added to 20 l of deionized water, and the mixture was stirred for 10 h and mixed evenly to obtain a slurry. The slurry was transferred into a spray drying device for spray drying granulation, and dried for 4 h at a set drying temperature of 250° C. to obtain powder. In a protective atmosphere of nitrogen (90 vol %) and hydrogen (10 vol %), the above powder was sintered for 4 h at 700° C. to obtain carbon-clad lithium manganese phosphate.

Comparative Example 2

Except that 689.5 g of manganese carbonate was used, and 463.3 g of ferrous carbonate was added, other conditions in Comparative Example 2 were the same as those in Comparative Example 1.

Comparative Example 3

Except that 1148.9 g of ammonium dihydrogen phosphate and 369.0 g of lithium carbonate were used, and 1.6 g of dilute sulphuric acid with a concentration of 60% was added, other conditions in Comparative Example 3 were the same as those in Comparative Example 1.

Comparative Example 4

Except that 689.5 g of manganese carbonate, 1148.9 g of ammonium dihydrogen phosphate and 369.0 g of lithium carbonate were used, and 463.3 g of ferrous carbonate and 1.6 g of dilute sulphuric acid with a concentration of 60% were added, other conditions in Comparative Example 4 were the same as those in Comparative Example 1.

Comparative Example 5

Except that in addition to adding the following steps: preparation of lithium iron pyrophosphate powder: 9.52 g of lithium carbonate, 29.9 g of ferrous carbonate, 29.6 g of ammonium dihydrogen phosphate and 32.5 g of oxalic acid dihydrate were dissolved in 50 ml of deionized water; the pH of the mixture was 5, and the mixture was stirred for 2 h to enable the reaction mixture to fully react; then, the solution after reaction was heated to 80° C. and the temperature was maintained for 4 h to obtain a suspension containing $Li_2FeP_2O_7$, and the suspension was filtered, washed with deionized water and dried for 4 h at 120° C. to obtain powder; the powder was sintered for 4 h at 500° C. in a nitrogen atmosphere, naturally cooled to a room temperature and then ground; the crystallinity of $Li_2FeP_2O_7$ was controlled to be 5%; and during preparation of a carbon-clad material, the amount of $Li_2FeP_2O_7$ was 62.8 g, other conditions in Comparative Example 5 were the same as those in Comparative Example 4.

Comparative Example 6

Except that in addition to adding the following steps: preparation of lithium iron phosphate suspension: 14.7 g of lithium carbonate, 46.1 g of ferrous carbonate, 45.8 g of ammonium dihydrogen phosphate and 50.2 g of oxalic acid dihydrate were dissolved in 500 ml of deionized water, and then stirred for 6 h to enable the mixture to fully react; then, the solution after reaction was heated to 120° C., and the temperature was maintained for 6 h to obtain a suspension containing $LiFePO_4$; in the preparation process of lithium iron phosphate ($LiFePO_4$), in the cladding and sintering step, the sintering temperature was 600° C. and the sintering time was 4 h to control the crystallinity of $LiFePO_4$ to be 8%; and during preparation of a carbon-clad material, the amount of $LiFePO_4$ was 62.8 g, other conditions in Comparative Example 6 were the same as those in Comparative Example 4.

Comparative Example 7

Except that in preparation of lithium iron pyrophosphate powder, 2.38 g of lithium carbonate, 7.5 g of ferrous carbonate, 7.4 g of ammonium dihydrogen phosphate and 8.1 g of oxalic acid dihydrate were dissolved in 50 ml of deionized water; the pH of the mixture was 5, and the mixture was stirred for 2 h to enable the reaction mixture to fully react; then, the solution after reaction was heated to 80° C. and the temperature was maintained for 4 h to obtain a suspension containing $Li_2FeP_2O_7$, and the suspension was filtered, washed with deionized water and dried for 4 h at 120° C. to obtain powder; the powder was sintered for 4 h at 500° C. in a nitrogen atmosphere, naturally cooled to a room temperature and then ground, and the crystallinity of $Li_2FeP_2O_7$ was controlled to be 5%;

In preparation of a lithium iron phosphate suspension, 11.1 g of lithium carbonate, 34.7 g of ferrous carbonate, 34.4 g of ammonium dihydrogen phosphate, 37.7 g of oxalic acid dihydrate and 37.3 g of sucrose (measured by $C_{12}H_{22}O_{11}$, the same below) were dissolved in 1500 ml of deionized water, and then stirred for 6 h to enable the mixture to fully react; then, the solution after reaction was heated to 120° C., and the temperature was maintained for 6 h to obtain a suspension containing $LiFePO_4$;

15.7 g of the obtained lithium iron pyrophosphate powder was added to the above suspension of lithium iron phosphate ($LiFePO_4$) and sucrose; and in the preparation process, in the cladding and sintering step, the sintering temperature was 600° C. and the sintering time was 4 h to control the crystallinity of $LiFePO_4$ to be 8%, other conditions in Comparative Example 7 were the same as those in Comparative Example 4. An amorphous lithium iron pyrophosphate, an amorphous lithium iron phosphate and a carbon-clad positive electrode active material were obtained.

Comparative Example 8-11

Except that in the preparation process of lithium iron pyrophosphate ($Li_2FeP_2O_7$), in the drying step, the drying temperature/drying time in Comparative Example 8-10 were respectively 80° C./3 h, 80° C./3 h and 80° C./3 h; in the preparation process of lithium iron pyrophosphate ($Li_2FeP_2O_7$), in the sintering step, the sintering temperature and sintering time in Comparative Example 8-10 were respectively 400° C./3 h, 400° C./3 h and 350° C./2 h; in Comparative Example 11, in the preparation process of lithium iron phosphate ($LiFePO_4$), in the drying step, the drying temperature/drying time were 80° C./3 h; and in Comparative Example 8-11, the amounts of $Li_2FeP_2O_7$/ $LiFePO_4$ were respectively 47.2 g/15.7 g, 15.7 g/47.2 g, 62.8 g/0 g and 0 g/62.8 g, other conditions were the same as those in Example 1-7.

The processes of [preparation of positive electrode plate], [preparation of negative electrode plate], [preparation of electrolyte solution], [separator] and [preparation of battery] in the above Examples and Comparative Examples were the same as processes in Example 1-1.

[Test of Relevant Parameters]

1. Test of Initial Gram Capacity of Button Battery

At 2.5-4.3 V, the above prepared button battery was charged to 4.3 V at 0.1 C, then charged at a constant voltage of 4.3 V until the current was less than or equal to 0.05 mA, left to stand for 5 min, and then discharged to 2.0 V at 0.1 C. The discharge capacity at this time was the initial gram capacity, recorded as D0.

2. Test of Average Discharge Voltage of Button Battery (V):

The above prepared button battery was left to stand for 5 min at a constant temperature of 25° C., discharged to 2.5 V at 0.1 C, left to stand for 5 min, charged to 4.3 V at 0.1 C, then charged at a constant voltage of 4.3 V until the current was less than or equal to 0.05 mA, left to stand for 5 min, and then discharged to 2.5 V at 0.1 C. At this time, the discharge capacity was the initial gram capacity, recorded as D0, the discharge energy was initial energy, recorded as E0, and thus, the average discharge voltage V of the button battery was E0/D0.

3. Bulge Test of Full Battery at 60° C.:

The above prepared full battery was stored at 100% state of charge (SOC) at 60° C. The open circuit voltage (OCV) and AC internal resistance (IMP) of a battery cell were measured before, after and during storage to monitor the SOC, and the volume of the battery cell was measured. After every 48 h of storage, the full battery was taken out and left to stand for 1 h, then, the open circuit voltage (OCV) and the internal resistance (IMP) were tested, and after the full battery was cooled to a room temperature, the volume of the battery cell was measured by a drainage method. The drainage method includes the steps of solely measuring the gravity $F_1$ of the battery cell first by a balance that automatically converts the unit data on a dial, and then placing the battery cell completely in deionized water (with a known density of 1 g/cm$^3$) to measure the gravity $F_2$ of the battery cell at this time, the buoyancy $F_{buoyancy}$ of the battery cell was $F_1-F_2$, and then, according to the Archimedes principle $F_{buoyancy}=\rho \times g \times V_{displacement}$, the volume $V=(F_1-F_2)/(\rho \times g)$ ($\rho \times g$) of the battery cell was calculated.

From the test results of the OCV and the IMP, it can be seen that throughout the experimental process until the end of storage, the batteries in all examples always maintain an SOC of 99% or above.

After 30 d of storage, the volume of the battery cell was measured, and the percentage increase in the volume of the battery cell after storage relative to the volume of the battery cell before storage was calculated.

In addition, the residual capacity of the battery cell was measured. At 2.5-4.3 V, the full battery was charged to 4.3 V at 1 C, then charged at a constant voltage of 4.3 V until the current was less than or equal to 0.05 mA, and left to stand for 5, and the charge capacity at this time was recorded as the residual capacity of the battery cell.

4. Test of Cycling Performance of Full Battery at 45° C.:

At a constant temperature of 45° C., at 2.5-4.3 V, the above prepared full battery was charged to 4.3 V at 1 C, then charged at a constant voltage of 4.3 V until the current was less than or equal to 0.05 mA, left to stand for 5 min, and then discharged to 2.5 V at 1 C, and the discharge capacity at this time was recorded as D0. The above charging and discharging cycles were repeated until the discharge capacity decreases to 80% of D0. The number of cycles of the battery at this time was recorded.

5. Test of Lattice Change Rate:

At a constant temperature of 25° C., the above prepared positive electrode active material sample was placed in an XRD (model: Bruker D8 Discover), the sample was tested at 1°/min, and the test data was sorted and analyzed. With reference to a standard PDF card, lattice constants a0, b0, c0 and v0 at this time were calculated (a0, b0 and c0 represent lengths in all aspects of a unit cell, and v0 represents a unit cell volume, which can be obtained directly from XRD refined results).

The positive electrode active material sample was prepared into a button battery by the above button battery preparation method, and the above button battery was charged at a small rate of 0.05 C until the current decreases to 0.01 C. Then, the positive electrode plate in the button battery was taken out and soaked in dimethyl carbonate (DMC) for 8 h. Then, oven drying and powder scraping processes were performed, and particles with a particle size less than 500 nm were screened out. A sample was taken, and the unit cell volume v1 was calculated in the same way as the fresh sample tested above. The lattice change rate (change rate of the unit cell volume) before and after complete lithium deintercalation was calculated by $(v0-v1)/v0 \times 100\%$ and shown in the table.

6. Test of Li/Mn Antisite Defect Concentration:

The Li/Mn antisite defect concentration was obtained by comparing the XRD results tested in a "lattice change rate measurement method" with a powder diffraction file (PDF) card of a standard crystal. Specifically, the XRD results tested in the "lattice change rate measurement method" were imported into the general structural analysis system (GSAS) software, refined results were automatically obtained, including the occupancy of different atoms, and the Li/Mn antisite defect concentration was obtained by reading the refined results.

7. Test of Dissolution of Transition Metals:

The full battery which was cycled at 45° C. until the capacity attenuates to 80% was discharged to a cut-off voltage of 2.0 V at a rate of 0.1 C. Then, the battery was disassembled, the negative electrode plate was taken out, 30 circular pieces with a unit area of 1540.25 mm$^2$ were taken randomly on the negative electrode plate, and inductively coupled plasma (ICP) emission spectra were tested by Agilent ICP-OES730. The amounts of Fe (if Fe was doped at the position of Mn in the positive electrode active material) and Mn were calculated according to ICP results, thereby calculating the dissolution amounts of Mn (and Fe doped at the position of Mn) after cycling. The test standard was based on EPA-6010D-2014.

8. Test of Surface Oxygen Valence State:

5 g of the above prepared positive electrode active material sample was taken and prepared into a button battery according to the above button battery preparation method. The button battery was charged at a small rate of 0.05 C until the current decreases to 0.01 C. Then, the positive electrode plate in the button battery was taken out and soaked in dimethyl carbonate (DMC) for 8 h. Then, oven drying and powder scraping processes were performed, and particles with a particle size less than 500 nm were screened out. The obtained particles were measured with an electron energy loss spectroscopy (EELS, instrument model: Talos F200S) to obtain an energy loss near edge structure (ELNES) which reflects the state density and energy level distribution situations of elements. Based on the state density and energy level distribution, the valence band state density data was integrated to calculate the number of electrons occupied, thereby deriving the valence state of surface oxygen after charging.

9. Measurement of Compacted Density:

5 g of the above prepared positive electrode active material powder was taken and placed in a special compaction mold (American CARVER mold, model: 13 mm), and then, the mold was placed on a compacted density instrument. A pressure of 3 T was applied, the thickness of the powder under the pressure (thickness after pressure relief) was read on the device, and the compacted density was calculated by $\rho=m/v$, where the area of a container for testing was 1540.25 mm$^2$.

10. Crystallinity of Pyrophosphate and Phosphate Tested by X-Ray Diffraction Method 5 g of the above prepared positive electrode active material powder was taken, and the total scattering intensity was measured by X rays, which was the sum of the scattering intensities of materials in the entire space, was only related to the intensity of primary rays, a chemical structure and the total number of electrons participating in diffraction, that is, the mass, and was independent of the order state of the sample. Then, crystalline scattering and non-crystalline scattering were split from a diffractogram, and the crystallinity was a ratio of the crystalline scattering to the total scattering intensity.

11. Interplanar Spacing and Included Angle 1 g of the above prepared positive electrode active material powder was taken and placed in a 50 mL test tube, 10 ml of alcohol with a mass fraction of 75% was injected into the test tube and then stirred fully to disperse the powder for 30 min, and then, an appropriate amount of the above solution was taken by a clean disposable plastic pipette and dropped on a 300-mesh copper screen. At this time, some of the powder was remained on the copper screen, the copper screen with the sample was transferred to a TEM (Talos F200s G2) sample cavity and tested to obtain an original TEM test picture, and an original picture format (xx.dm3) was saved.

The original picture obtained by the above TEM test was opened in the DigitalMicrograph software, and Fourier transform was performed (automatically completed by the software after clicking the operation) to obtain a diffraction pattern. A distance from a diffraction spot to a center position in the diffraction pattern was measured to obtain an interplanar spacing, and an included angle was calculated according to a Bragg equation.

TABLE 1

Performance test results of Examples 1-1 to 1-33 and Comparative Example 1-7

| Example No.: | Inner core | First cladding layer | Second cladding layer | Lattice change rate (%) | Li/Mn antisite defect concentration (%) |
|---|---|---|---|---|---|
| Example 1-1 | $Li_{0.999}Mn_{0.60}Fe_{0.393}V_{0.004}Co_{0.003}P_{0.999}S_{0.001}O_4$ | 1% $Li_2FeP_2O_7$/ 3% $LiFePO_4$ | 2% carbon | 2.4 | 0.4 |
| Example 1-2 | $Li_{0.999}Mn_{0.60}Fe_{0.40}P_{0.999}S_{0.001}O_4$ | 0.8% $Li_2FeP_2O_7$/ 2.4% $LiFePO_4$ | 1% carbon | 6.6 | 1.2 |
| Example 1-3 | $Li_{0.999}Mn_{0.60}Fe_{0.40}P_{0.999}S_{0.001}O_4$ | 1% $Li_2FeP_2O_7$/ 3% $LiFePO_4$ | 1% carbon | 6.5 | 1.1 |
| Example 1-4 | $Li_{0.999}Mn_{0.60}Fe_{0.40}P_{0.999}S_{0.001}O_4$ | 1.2% $Li_2FeP_2O_7$/ 3.6% $LiFePO_4$ | 1% carbon | 6.5 | 0.8 |
| Example 1-5 | $Li_{0.999}Mn_{0.60}Fe_{0.40}P_{0.999}S_{0.001}O_4$ | 1.4% $Li_2FeP_2O_7$/ 4.2% $LiFePO_4$ | 1% carbon | 6.5 | 0.7 |
| Example 1-6 | $Li_{0.999}Mn_{0.60}Fe_{0.40}P_{0.999}S_{0.001}O_4$ | 1.6% $Li_2FeP_2O_7$/ 4.8% $LiFePO_4$ | 1% carbon | 6.6 | 0.6 |
| Example 1-7 | $Li_{0.999}Mn_{0.60}Fe_{0.40}P_{0.999}S_{0.001}O_4$ | 1% $Li_2FeP_2O_7$/ 3% $LiFePO_4$ | 2% carbon | 6.5 | 1.0 |
| Example 1-8 | $Li_{0.999}Mn_{0.60}Fe_{0.40}P_{0.999}S_{0.001}O_4$ | 1% $Li_2FeP_2O_7$/ 3% $LiFePO_4$ | 4% carbon | 6.5 | 1.0 |
| Example 1-9 | $Li_{0.999}Mn_{0.60}Fe_{0.40}P_{0.999}S_{0.001}O_4$ | 1% $Li_2FeP_2O_7$/ 3% $LiFePO_4$ | 5% carbon | 6.4 | 1.1 |
| Example 1-10 | $Li_{0.999}Mn_{0.60}Fe_{0.40}P_{0.999}S_{0.001}O_4$ | 1% $Li_2FeP_2O_7$/ 3% $LiFePO_4$ | 6% carbon | 6.4 | 1.1 |
| Example 1-11 | $Li_{0.999}Mn_{0.60}Fe_{0.40}P_{0.999}S_{0.001}O_4$ | 1.5% $Li_2FeP_2O_7$/ 2.5% $LiFePO_4$ | 2% carbon | 6.5 | 1.1 |
| Example 1-12 | $Li_{0.999}Mn_{0.60}Fe_{0.40}P_{0.999}S_{0.001}O_4$ | 2% $Li_2FeP_2O_7$/ 2% $LiFePO_4$ | 2% carbon | 6.6 | 1.0 |

TABLE 1-continued

Performance test results of Examples 1-1 to 1-33 and Comparative Example 1-7

| Example | Formula | | | | |
|---|---|---|---|---|---|
| Example 1-13 | $Li_{0.999}Mn_{0.60}Fe_{0.40}P_{0.999}S_{0.001}O_4$ | 2.5% $Li_2FeP_2O_7$/ 1.5% $LiFePO_4$ | 2% carbon | 6.7 | 1.2 |
| Example 1-14 | $Li_{0.999}Mn_{0.60}Fe_{0.40}P_{0.999}S_{0.001}O_4$ | 3% $Li_2FeP_2O_7$/ 1% $LiFePO_4$ | 2% carbon | 6.7 | 1.1 |
| Example 1-15 | $Li_{0.999}Mn_{0.60}Zn_{0.40}P_{0.999}S_{0.001}O_4$ | 3% $Li_2FeP_2O_7$/ 1% $LiFePO_4$ | 2% carbon | 7.5 | 2.5 |
| Example 1-16 | $Li_{0.993}Mn_{0.6}Ni_{0.393}Zn_{0.004}Ti_{0.003}P_{0.999}S_{0.001}O_4$ | 1% $Li_2FeP_2O_7$/ 3% $LiFePO_4$ | 2% carbon | 5.4 | 0.8 |
| Example 1-17 | $Li_{0.999}Mn_{0.60}Fe_{0.393}V_{0.007}P_{0.999}S_{0.001}O_4$ | 1% $Li_2FeP_2O_7$/ 3% $LiFePO_4$ | 2% carbon | 4.2 | 0.6 |
| Example 1-18 | $Li_{0.999}Mn_{0.60}Fe_{0.393}V_{0.004}Mg_{0.003}P_{0.999}S_{0.001}O_4$ | 1% $Li_2FeP_2O_7$/ 3% $LiFePO_4$ | 2% carbon | 2.6 | 0.5 |
| Example 1-19 | $LiMn_{0.60}Fe_{0.393}V_{0.004}Mg_{0.003}P_{0.999}N_{0.001}O_4$ | 1% $Li_2FeP_2O_7$/ 3% $LiFePO_4$ | 2% carbon | 2.3 | 0.5 |
| Example 1-20 | $Li_{1.001}Mn_{0.60}Fe_{0.393}V_{0.004}Mg_{0.003}P_{0.999}Si_{0.001}O_4$ | 1% $Li_2FeP_2O_7$/ 3% $LiFePO_4$ | 2% carbon | 2.4 | 0.7 |
| Example 1-21 | $Li_{1.001}Mn_{0.55}Fe_{0.40}V_{0.025}Mg_{0.025}P_{0.999}Si_{0.001}O_4$ | 1% $Li_2FeP_2O_7$/ 3% $LiFePO_4$ | 2% carbon | 2.2 | 0.5 |
| Example 1-22 | $Li_{1.001}Mn_{0.65}Fe_{0.25}V_{0.05}Mg_{0.05}P_{0.999}Si_{0.001}O_4$ | 1% $Li_2FeP_2O_7$/ 3% $LiFePO_4$ | 2% carbon | 2.5 | 0.8 |
| Example 1-23 | $Li_{1.004}Mn_{0.7}Fe_{0.2}V_{0.05}Mg_{0.05}P_{0.998}B_{0.002}O_4$ | 1% $Li_2FeP_2O_7$/ 3% $LiFePO_4$ | 2% carbon | 2.6 | 0.8 |
| Example 1-24 | $Li_{1.006}Mn_{0.75}Fe_{0.15}V_{0.05}Mg_{0.05}P_{0.997}B_{0.003}O_4$ | 1% $Li_2FeP_2O_7$/ 3% $LiFePO_4$ | 2% carbon | 2.6 | 0.8 |
| Example 1-25 | $Li_{1.002}Mn_{0.60}Fe_{0.393}V_{0.004}Mg_{0.003}P_{0.998}Si_{0.002}O_4$ | 1% $Li_2FeP_2O_7$/ 3% $LiFePO_4$ | 2% carbon | 2.3 | 0.7 |
| Example 1-26 | $Li_{0.997}Mn_{0.80}Fe_{0.194}V_{0.003}Mg_{0.003}P_{0.997}S_{0.003}O_4$ | 1% $Li_2FeP_2O_7$/ 3% $LiFePO_4$ | 2% carbon | 2.8 | 0.9 |
| Example 1-27 | $Li_{0.996}Mn_{0.60}Fe_{0.393}V_{0.004}Mg_{0.003}P_{0.996}S_{0.004}O_4$ | 1% $Li_2FeP_2O_7$/ 3% $LiFePO_4$ | 2% carbon | 2.2 | 0.6 |
| Example 1-28 | $Li_{0.995}Mn_{0.9}Fe_{0.094}V_{0.003}Mg_{0.003}P_{0.995}S_{0.005}O_4$ | 1% $Li_2FeP_2O_7$/ 3% $LiFePO_4$ | 2% carbon | 3.2 | 1.1 |
| Example 1-29 | $Li_{0.994}Mn_{0.90}Fe_{0.094}V_{0.003}Mg_{0.003}P_{0.994}S_{0.006}O_4$ | 1% $Li_2FeP_2O_7$/ 3% $LiFePO_4$ | 2% carbon | 3.0 | 1.2 |
| Example 1-30 | $Li_{0.993}Mn_{0.90}Fe_{0.094}V_{0.003}Mg_{0.003}P_{0.993}S_{0.007}O_4$ | 1% $Li_2FeP_2O_7$/ 3% $LiFePO_4$ | 2% carbon | 2.8 | 1.4 |
| Example 1-31 | $Li_{0.992}Mn_{0.90}Fe_{0.094}V_{0.003}Mg_{0.003}P_{0.992}S_{0.008}O_4$ | 1% $Li_2FeP_2O_7$/ 3% $LiFePO_4$ | 2% carbon | 2.6 | 1.4 |

TABLE 1-continued

Performance test results of Examples 1-1 to 1-33 and Comparative Example 1-7

| | | | | | |
|---|---|---|---|---|---|
| Example 1-32 | $Li_{0.991}Mn_{0.90}Fe_{0.094}V_{0.003}Mg_{0.003}P_{0.991}S_{0.009}O_4$ | 1% $Li_2FeP_2O_7$/ 3% $LiFePO_4$ | 2% carbon | 2.4 | 1.2 |
| Example 1-33 | $Li_{0.9}Mn_{0.90}Fe_{0.094}V_{0.003}Mg_{0.003}P_{0.9}S_{0.1}O_4$ | 1% $Li_2FeP_2O_7$/ 3% $LiFePO_4$ | 2% carbon | 2.1 | 0.9 |
| Comparative Example 1 | $LiMnPO_4$ | — | 1% carbon | 11.4 | 3.2 |
| Comparative Example 2 | $LiMn_{0.60}Fe_{0.40}PO_4$ | — | 1% carbon | 8.7 | 2.8 |
| Comparative Example 3 | $Li_{0.999}MnP_{0.999}S_{0.001}O_4$ | — | 1% carbon | 9.8 | 2.5 |
| Comparative Example 4 | $Li_{0.999}Mn_{0.60}Fe_{0.40}P_{0.999}S_{0.001}O_4$ | — | 1% carbon | 6.7 | 1.8 |
| Comparative Example 5 | $Li_{0.999}Mn_{0.60}Fe_{0.40}P_{0.999}S_{0.001}O_4$ | 4% amorphous $Li_2FeP_2O_7$ | 1% carbon | 6.5 | 1.8 |
| Comparative Example 6 | $Li_{0.999}Mn_{0.60}Fe_{0.40}P_{0.999}S_{0.001}O_4$ | 4% amorphous $LiFePO_4$ | 1% carbon | 6.6 | 1.8 |
| Comparative Example 7 | $Li_{0.999}Mn_{0.60}Fe_{0.40}P_{0.999}S_{0.001}O_4$ | 1% amorphous $Li_2FeP_2O_7$ + 3% amorphous $LiFePO_4$ | 1% carbon | 6.6 | 1.8 |

| Example No.: | Surface oxygen valence state | Dissolution amounts of Mn and Fe after cycling (ppm) | Gram capacity of button battery at 0.1 C (mAh/g) | Average discharge voltage of button battery (V) | Battery cell expansion rate (%) after storage at 60° C. for 30 d | Number of cycles for 80% of capacity retention rate at 45° C. |
|---|---|---|---|---|---|---|
| Example 1-1 | −1.98 | 5 | 159.1 | 3.81 | 1.4 | 1422 |
| Example 1-2 | −1.97 | 23 | 154.9 | 3.79 | 3.7 | 985 |
| Example 1-3 | −1.97 | 16 | 151.3 | 3.77 | 2.9 | 997 |
| Example 1-4 | −1.97 | 9 | 149.2 | 3.76 | 2.3 | 1012 |
| Example 1-5 | −1.98 | 8 | 151.7 | 3.78 | 1.8 | 1032 |
| Example 1-6 | −1.98 | 7 | 152.9 | 3.76 | 1.5 | 1257 |
| Example 1-7 | −1.97 | 15 | 147.8 | 3.75 | 2.1 | 1043 |
| Example 1-8 | −1.97 | 13 | 148.5 | 3.75 | 1.9 | 1137 |
| Example 1-9 | −1.98 | 11 | 146.7 | 3.76 | 1.7 | 1248 |
| Example 1-10 | −1.98 | 8 | 148.6 | 3.77 | 1.4 | 1346 |
| Example 1-11 | −1.97 | 13 | 149.3 | 3.79 | 2.9 | 1025 |
| Example 1-12 | −1.96 | 9 | 151.4 | 3.78 | 3.4 | 987 |
| Example 1-13 | −1.96 | 7 | 153.2 | 3.78 | 3.5 | 899 |
| Example 1-14 | −1.97 | 6 | 149.1 | 3.8 | 3.7 | 867 |
| Example 1-15 | −1.97 | 10 | 146.2 | 3.9 | 4.2 | 912 |
| Example 1-16 | −1.97 | 9 | 147.5 | 3.91 | 1.8 | 1055 |
| Example 1-17 | −1.97 | 7 | 155.2 | 3.81 | 1.5 | 1376 |
| Example 1-18 | −1.97 | 7 | 156.9 | 3.83 | 1.1 | 1301 |
| Example 1-19 | −1.98 | 6 | 158.7 | 3.85 | 0.9 | 1423 |
| Example 1-20 | −1.98 | 8 | 158.3 | 3.84 | 1 | 1412 |
| Example 1-21 | −1.98 | 5 | 159.2 | 3.79 | 0.8 | 1501 |
| Example 1-22 | −1.98 | 6 | 158.4 | 3.86 | 1.5 | 1342 |
| Example 1-23 | −1.98 | 6 | 159.5 | 3.89 | 1.3 | 1321 |
| Example 1-24 | −1.98 | 6 | 158.2 | 3.85 | 1.5 | 1389 |
| Example 1-25 | −1.98 | 5 | 158.9 | 3.82 | 1.1 | 1403 |
| Example 1-26 | −1.98 | 8 | 159.1 | 3.89 | 1.4 | 1251 |
| Example 1-27 | −1.98 | 6 | 158.5 | 3.82 | 1.3 | 1423 |
| Example 1-28 | −1.96 | 8 | 157.6 | 3.93 | 1.4 | 1247 |
| Example 1-29 | −1.95 | 9 | 158.1 | 3.92 | 1.9 | 1109 |
| Example 1-30 | −1.95 | 9 | 157.6 | 3.94 | 1.4 | 1011 |
| Example 1-31 | −1.94 | 8 | 156.9 | 3.93 | 1.6 | 984 |
| Example 1-32 | −1.94 | 11 | 157.3 | 3.95 | 1.1 | 956 |
| Example 1-33 | −1.94 | 9 | 156.7 | 3.93 | 1 | 932 |
| Comparative Example 1 | −1.55 | 648 | 141.1 | 4.08 | 25.5 | 253 |
| Comparative Example 2 | −1.76 | 412 | 143.2 | 3.82 | 21.3 | 375 |
| Comparative Example 3 | −1.66 | 535 | 142.6 | 4.09 | 22.4 | 321 |
| Comparative Example 4 | −1.83 | 305 | 144.2 | 3.87 | 19.7 | 498 |

TABLE 1-continued

| | | | | | | |
|---|---|---|---|---|---|---|
| Comparative Example 5 | −1.90 | 92 | 145.6 | 3.85 | 7.85 | 597 |
| Comparative Example 6 | −1.91 | 127 | 144.5 | 3.88 | 6.93 | 567 |
| Comparative Example 7 | −1.90 | 57 | 146.1 | 3.84 | 3.54 | 752 |

Note:
1) in Examples 1-1 to 1-33, the crystallinity of both $Li_2FeP_2O_7$ and $LiFePO_4$ was 100%; and
2) in Comparative Example 5-7, the crystallinity of $Li_2FeP_2O_7$ was 5%, and the crystallinity of $LiFePO_4$ was 8%.

By combination of Examples 1-1 to 1-33 and Comparative Example 1-4, it can be seen that the presence of the first cladding layer was favorable for reducing the Li/Mn antisite defect concentration of the obtained material and the dissolution amounts of Fe and manganese ions after cycling, increasing the gram capacity of the button battery, and improving the safety performance and cycling performance of the battery. When other elements were respectively doped at the position of Mn and the position of phosphorus, the lattice change rate, antisite defect concentration and dissolution amounts of Fe and manganese ions of the obtained material can be significantly reduced, the gram capacity of the battery can be increased, and the safety performance and cycling performance of the battery can be improved.

By combination of Examples 1-1 to 1-6, it can be seen that as the amount of the first cladding layer increases from 3.2% to 6.4%, the Li/Mn antisite defect concentration of the obtained material was gradually reduced, the dissolution amounts of Fe and manganese ions after cycling were gradually reduced, correspondingly, the safety performance and cycling performance at 45° C. of the battery were also improved, but the gram capacity of the button battery was slightly reduced. Optionally, when the total amount of the first cladding layer was 4-5.6 wt %, the corresponding comprehensive performance of the battery was optimal.

By combination of Example 1-3 and Examples 1-7 to 1-10, it can be seen that as the amount of the second cladding layer increases from 1% to 6%, the Li/Mn antisite defect concentration of the obtained material was gradually reduced, the dissolution amounts of Fe and manganese ions after cycling were gradually reduced, correspondingly, the safety performance and cycling performance at 45° C. of the battery were also improved, but the gram capacity of the button battery was slightly reduced. Optionally, when the total amount of the second cladding layer was 3-5 wt %, the corresponding comprehensive performance of the battery was optimal.

By combination of Examples 1-11 to 1-15 and Comparative Example 5-6, it can be seen that when $Li_2FeP_2O_7$ and $LiFePO_4$ coexist in the first cladding layer, especially when the weight ratio of $Li_2FeP_2O_7$ to $LiFePO_4$ was 1:3 to 3:1, and particularly 1:3 to 1:1, the improvement in battery performance was more significant.

TABLE 2

Performance test results of Examples 2-1 to 2-4

| Example No.: | First cladding layer | Crystallinity of pyrophosphate and phosphate[1] | Lattice change rate (%) | Li/Mn antisite defect concentration (%) | Surface oxygen valence state | Dissolution amounts of Fe and manganese ions after cycling (ppm) | Capacity of button battery at 0.1 C (mAh/g) | Average discharge voltage of button battery (V) | Battery cell expansion rate (%) after storage at 60° C. for 30 d | Cycling capacity retention rate at 45° C. |
|---|---|---|---|---|---|---|---|---|---|---|
| Example 2-1 | 1% $Li_2FeP_2O_7$/ 3% $LiFePO_4$ | 30% | 6.3 | 1.9 | −1.88 | 83 | 147.2 | 3.73 | 3.1 | 782 |
| Example 2-2 | 1% $Li_2FeP_2O_7$/ 3% $LiFePO_4$ | 50% | 4.7 | 1.2 | −1.89 | 47 | 151.2 | 3.77 | 2.9 | 964 |
| Example 2-3 | 1% $Li_2FeP_2O_7$/ 3% $LiFePO_4$ | 70% | 3.5 | 0.8 | −1.91 | 13 | 154.3 | 3.78 | 1.8 | 1137 |
| Example 2-4 | 1% $Li_2FeP_2O_7$/ 3% $LiFePO_4$ | 100% | 2.4 | 0.4 | −1.98 | 6 | 161.3 | 3.81 | 1.1 | 1423 |

[1]means that the crystallinity of $Li_2FeP_2O_7$ and $LiFePO_4$ was respectively 30%, 50%, 70% and 100%.

It can be seen from Table 2 that as the crystallinity of pyrophosphate and phosphate in the first cladding layer gradually increases, the corresponding lattice change rate, Li/Mn antisite defect concentration and dissolution amounts of Fe and manganese ions of the material were gradually reduced, the button battery capacity of the battery was gradually increased, and the safety performance and cycling performance were also gradually improved.

TABLE 3

Performance test results of Examples 3-1 to 3-12

| Example No.: | Temperature in reactor (° C.) | Stirring time/ min | Lattice change rate (%) | Li/Mn antisite defect concentration (%) | Surface oxygen valence state | Dissolution amounts of Fe and manganese ions after cycling (ppm) | Capacity of button battery at 0.1 C (mAh/g) | Average discharge voltage of button battery (V) | Battery cell expansion rate (%) after storage at 60° C. for 30 d | Number of cycles for 80% of capacity retention rate at 45° C. |
|---|---|---|---|---|---|---|---|---|---|---|
| Example 3-1 | 60 | 120 | 5.6 | 2.4 | −1.98 | 25 | 157.2 | 3.72 | 3.4 | 1187 |
| Example 3-2 | 70 | 120 | 4.8 | 1.9 | −1.98 | 21 | 158.7 | 3.75 | 2.6 | 1254 |
| Example 3-3 | 80 | 120 | 3.7 | 1.3 | −1.98 | 17 | 157.4 | 3.77 | 1.9 | 1312 |
| Example 3-4 | 90 | 120 | 2.9 | 1.1 | −1.98 | 9 | 158.8 | 3.79 | 1.7 | 1343 |
| Example 3-5 | 100 | 120 | 2.5 | 0.5 | −1.98 | 7 | 159.7 | 3.81 | 1.3 | 1376 |
| Example 3-6 | 110 | 120 | 2.8 | 1.2 | −1.98 | 11 | 158.5 | 3.77 | 1.5 | 1312 |
| Example 3-7 | 120 | 120 | 3.7 | 2.1 | −1.98 | 15 | 156.1 | 3.73 | 2.3 | 1243 |
| Example 3-8 | 130 | 120 | 4.5 | 3.4 | −1.98 | 21 | 155.4 | 3.69 | 3.1 | 1054 |
| Example 3-9 | 100 | 60 | 4.9 | 3.1 | −1.98 | 19 | 156.1 | 3.79 | 2.6 | 1067 |
| Example 3-10 | 100 | 90 | 4.1 | 2.5 | −1.98 | 12 | 157.8 | 3.81 | 2.5 | 1121 |
| Example 3-11 | 100 | 150 | 3.5 | 1.1 | −1.98 | 9 | 159.8 | 3.82 | 1.7 | 1231 |
| Example 3-12 | 100 | 180 | 2.5 | 0.5 | −1.98 | 6 | 158.4 | 3.83 | 1.3 | 1362 |

Note
1. The temperature and stirring time in the reactor were parameters in the process of preparing manganese oxalate doped with the element A (that is, step (1)).
2. Types and doping amounts of doped elements: $Li_{0.999}Mn_{0.60}Fe_{0.393}V_{0.004}Co_{0.003}P_{0.999}S_{0.001}O_4$.

It can be seen from Table 3 that by adjusting the reaction temperature and reaction time in the reactor in the preparation process of manganese oxalate particles, various performances of the positive electrode material in the present application can be further improved. For example, in the process of gradually increasing the reaction temperature from 60° C. to 130° C., the lattice change rate and the Li/Mn antisite defect concentration first decrease and then increase, correspondingly, the dissolution amounts of metals after cycling and the safety performance also present similar rules, but the button battery capacity and the cycling performance first increase and then decrease as the temperature increases. Similar rules can also be presented by controlling the reaction temperature to remain unchanged and adjusting the reaction time.

TABLE 4

Performance test results of Examples 4-1 to 4-7 and Comparative Example 8-11

| Example No.: | $Li_2FeP_2O_7$:$LiFePO_4$ (weight ratio) | Drying temperature (° C.) | Drying time (h) | Sintering temperature (° C.) | Sintering time (h) | Lattice spacing of pyrophosphate in first cladding layer (nm) | Included angle of pyrophosphate in first cladding layer (°) | Lattice spacing of phosphate in first cladding layer (nm) |
|---|---|---|---|---|---|---|---|---|
| Example 4-1 | 1:3 | 100 | 4 | 700 | 6 | 0.303 | 29.496 | 0.348 |
| Example 4-2 | 1:3 | 150 | 6 | 700 | 6 | 0.303 | 29.496 | 0.348 |
| Example 4-3 | 1:3 | 200 | 6 | 700 | 6 | 0.303 | 29.496 | 0.348 |
| Example 4-4 | 1:3 | 200 | 6 | 600 | 6 | 0.303 | 29.496 | 0.348 |
| Example 4-5 | 1:1 | 150 | 6 | 600 | 4 | 0.303 | 29.496 | 0.348 |

TABLE 4-continued

Performance test results of Examples 4-1 to 4-7 and Comparative Example 8-11

| Example No.: | | | | | | | | |
|---|---|---|---|---|---|---|---|---|
| Example 4-6 | 1:1 | 150 | 6 | 600 | 6 | 0.303 | 29.496 | 0.348 |
| Example 4-7 | 1:1 | 150 | 6 | 800 | 8 | 0.303 | 29.496 | 0.348 |
| Comparative Example 8 | 1:3 | 80 | 3 | 400 | 3 | — | — | — |
| Comparative Example 9 | 1:1 | 80 | 3 | 400 | 3 | — | — | — |
| Comparative Example 10 | Only $Li_2FeP_2O_7$ | 80 | 3 | 350 | 2 | — | — | — |
| Comparative Example 11 | Only $LiFePO_4$ | 80 | 3 | — | — | — | — | — |

| Example No.: | Included angle of phosphate in first cladding layer (°) | Lattice change rate (%) | Li/Mn antisite defect concentration (%) | Surface oxygen valence state | Dissolution amounts of Fe and manganese ions after cycling (ppm) | Capacity of button battery at 0.1 C (mAh/g) | Average discharge voltage of button battery (V) | Battery cell expansion rate (%) after storage at 60° C. for 30 d | Number of cycles for 80% of capacity retention rate at 45° C. |
|---|---|---|---|---|---|---|---|---|---|
| Example 4-1 | 25.562 | 2.9 | 0.6 | −1.97 | 15 | 156.4 | 3.73 | 1.9 | 1211 |
| Example 4-2 | 25.562 | 2.6 | 0.6 | −1.98 | 15 | 158.9 | 3.82 | 1.4 | 1397 |
| Example 4-3 | 25.562 | 2.7 | 0.6 | −1.98 | 15 | 157.5 | 3.76 | 1.7 | 1321 |
| Example 4-4 | 25.562 | 2.9 | 1.1 | −1.95 | 15 | 154.8 | 3.72 | 1.8 | 1021 |
| Example 4-5 | 25.562 | 2.8 | 1.2 | −1.94 | 9 | 156.1 | 3.74 | 1.5 | 957 |
| Example 4-6 | 25.562 | 2.6 | 0.8 | −1.95 | 9 | 156.9 | 3.75 | 1.4 | 997 |
| Example 4-7 | 25.562 | 2.5 | 0.4 | −1.97 | 9 | 157.4 | 3.78 | 1.2 | 1057 |
| Comparative Example 8 | — | 3.9 | 1.8 | −1.91 | 43 | 149.0 | 3.73 | 9.1 | 797 |
| Comparative Example 9 | — | 3.6 | 1.6 | −1.93 | 68 | 151.8 | 3.74 | 6.3 | 711 |
| Comparative Example 10 | — | 3.7 | 1.7 | −1.86 | 73 | 149.5 | 3.74 | 10.2 | 414 |
| Comparative Example 11 | — | 3.4 | 1.4 | −1.93 | 87 | 152.6 | 3.76 | 4.3 | 537 |

It can be seen from Table 4 that when lithium iron pyrophosphate was prepared by the method of the present application, by adjusting the drying temperature/time and sintering temperature/time in the preparation process, the performance of the obtained material can be improved, thereby improving the battery performance. It can be seen from Comparative Example 8-11 that when the drying temperature in the preparation process of lithium iron pyrophosphate was lower than 100° C. or the temperature in the sintering step was lower than 400° C., $Li_2FeP_2O_7$ desired by the present application cannot be obtained, so that the material performance and the performance of the battery containing the obtained material cannot be improved.

Example 5-37

A positive electrode active material, a button battery and a full battery were prepared in the same way as Example 1-18, but the composition of an electrolyte solution was changed, as shown in Table 5 specifically.

Moreover, performance data of the button battery or the full battery in Example 5-37 was measured by the above performance test method, as shown in Table 6.

TABLE 5

Composition of electrolyte solution

| Example No.: | First additive | Content W1 (%) | Second additive | Content W2 (%) | M value of W1/W2 | Electrolyte salt | Electrolyte salt content (M) | C value of W1/ (C1 + C2) |
|---|---|---|---|---|---|---|---|---|
| 5 | The same as Example 1-18 | 0.5 | The same as Example 1-18 | 0.5 | | The same as Example 1-18 | | 0.08 |
| 6 | | 10 | | 10 | | | | 0.17 |
| 7 | | 1 | | 1 | | | | 0.17 |
| 8 | | 3 | | 3 | | | | 0.50 |
| 9 | | 0.01 | | 0.01 | | | | 0.00 |
| 10 | | 5 | | 5 | | | | 0.83 |
| 11 | | 0.005 | | 0.005 | | | | 0.00 |
| 12 | | 20 | | 20 | | | | 3.33 |
| 13 | The same as Example 1-18 | | | 0.3 | 6.67 | The same as Example 1-18 | | 0.33 |
| 14 | | | | 5 | 0.4 | | | 0.33 |
| 15 | | | | 0.1 | 20 | | | 0.33 |
| 16 | | | | 10 | 0.2 | | | 0.33 |
| 17 | | | | 0.01 | 200 | | | 0.33 |
| 18 | | | | 20 | 0.1 | | | 0.33 |
| 19 | | The same as Example 1-18 | | | | | 0.8 | 0.5 |
| 20 | | | | | | | 2 | 0.5 |

TABLE 5-continued

Composition of electrolyte solution

| Example No.: | First additive | Content W1 (%) | Second additive | Content W2 (%) | M value of W1/W2 | Electrolyte salt | Electrolyte salt content (M) | C value of W1/ (C1 + C2) |
|---|---|---|---|---|---|---|---|---|
| 21 | | | | | | | 0.5 | 0.5 |
| 22 | | | | | | | 2.5 | 0.5 |
| 23 | | | | | | | 0.3 | 0.5 |
| 24 | | | | | | | 1.5 | 0.5 |
| 25 | | | | | | | 3.0 | 0.5 |
| 26 | | 0.006 | | | | | | 0.001 |
| 27 | | 0.06 | | | | | | 0.01 |
| 28 | | 12 | | | | | | 2 |
| 29 | | The same as | | | | | | The same as |
| 30 | | Example 1-18 | | | | | | Example 1-18 |
| 31 | Compound 2 | | | | The same as Example 1-18 | | | |
| 32 | Compound 3 | | | | | | | |
| 33 | Compound 4 | | | | | | | |
| 34 | The same as | | Compound 6 | | The same as Example 1-18 | | | |
| 35 | Example 1-18 | | Compound 7 | | | | | |
| 36 | | | The same as Example 1-18 | | | LiFSI | The same as | |
| 37 | | | | | | LiTFSI | Example 1-18 | |

TABLE 6

Performance data of button battery or full battery in Example 5-37 measured by above performance test method

| Example No.: | Dissolution amounts of Fe and manganese ions after cycling (ppm) | Gram capacity of button battery at 0.1 C (mAh/g) | Average discharge voltage of button battery (V) | Battery cell expansion rate (%) after storage at 60° C. for 30 d | Number of cycles for 80% of capacity retention rate at 45° C. |
|---|---|---|---|---|---|
| Example 5 | 8 | 151.7 | 3.78 | 1.8 | 1032 |
| Example 6 | 7 | 152.9 | 3.76 | 1.5 | 1257 |
| Example 7 | 9 | 155.9 | 3.81 | 2.0 | 1261 |
| Example 8 | 6 | 157.3 | 3.84 | 1 | 1321 |
| Example 9 | 8 | 155.7 | 3.8 | 2.1 | 1291 |
| Example 10 | 5 | 157.6 | 3.85 | 0.8 | 1335 |
| Example 11 | 10 | 155.8 | 3.8 | 2.5 | 1267 |
| Example 12 | 4 | 157.5 | 3.85 | 0.6 | 1334 |
| Example 13 | 9 | 156.2 | 3.81 | 1.4 | 1298 |
| Example 14 | 7 | 157.1 | 3.83 | 0.9 | 1317 |
| Example 15 | 10 | 156 | 3.81 | 1.6 | 1287 |
| Example 16 | 6 | 157.3 | 3.84 | 0.7 | 1343 |
| Example 17 | 10 | 155.9 | 3.81 | 1.6 | 1248 |
| Example 18 | 6 | 156.2 | 3.82 | 0.5 | 1357 |
| Example 19 | 9 | 156.1 | 3.82 | 1.2 | 1297 |
| Example 20 | 9 | 156.3 | 3.81 | 1.5 | 1321 |
| Example 21 | 10 | 153.1 | 3.78 | 1.8 | 1089 |
| Example 22 | 9 | 156.5 | 3.82 | 1.6 | 1352 |
| Example 23 | 11 | 149.1 | 3.74 | 1.6 | 957 |
| Example 24 | 9 | 156.2 | 3.82 | 1.3 | 1276 |
| Example 25 | 8 | 155.9 | 3.79 | 1.8 | 1032 |
| Example 26 | 10 | 155.7 | 3.80 | 1.8 | 1240 |
| Example 27 | 10 | 155.6 | 3.8 | 2.5 | 1256 |
| Example 28 | 7 | 157 | 3.83 | 0.8 | 1379 |
| Example 29 | 9 | 155.9 | 3.8 | 1.6 | 1258 |
| Example 30 | 10 | 155.7 | 3.81 | 1.3 | 1264 |
| Example 31 | 8 | 156.8 | 3.83 | 1.2 | 1286 |
| Example 32 | 7 | 156.5 | 3.83 | 1.5 | 1300 |
| Example 33 | 9 | 156.4 | 3.80 | 1.5 | 1021 |
| Example 34 | 7 | 156.1 | 3.81 | 1.1 | 1375 |
| Example 35 | 8 | 257.1 | 3.82 | 1.1 | 1334 |
| Example 36 | 7 | 156.7 | 3.82 | 1.2 | 1289 |
| Example 37 | 8 | 156.6 | 3.83 | 1.5 | 1297 |

Moreover, the electrolyte solution in the full battery in the above Examples 1-1 to 1-33, 2-1 to 2-4, 3-1 to 3-12 and 4-1 to 4-4 was replaced with an electrolyte solution obtained by evenly mixing ethylene carbonate (EC)/ethyl methyl carbonate (EMC) in a volume ratio of 3/7, adding and dissolving 12.5 wt % (based on the weight of the organic solvent) of $LiPF_6$ in the above organic solvent, and evenly stirring the mixture. The electrolyte solution in the button battery was replaced with a solution of 1 mol/L $LiPF_6$ in ethylene carbonate (EC), diethyl carbonate (DEC) and dimethyl carbonate (DMC) in a volume ratio of 1:1:1. The dissolution amounts of Fe and manganese ions after cycling (ppm) of the button battery or the full battery, the gram capacity of the button battery at 0.1 C (mAh/g), the average discharge voltage of the button battery (V), the number of cycles for 80% of the capacity retention rate at 45° C., and the battery cell expansion rate after storage at 60° C. (%) in Comparative Examples 1-1 to 1-33, 2-1 to 2-4, 3-1 to 3-12 and 4-1 to 4-4 were detected according to the above method, and detection results were recorded in Table 7.

TABLE 7

| No. | Dissolution amounts of Fe and manganese ions after cycling (ppm) | Gram capacity of button battery at 0.1 C (mAh/g) | Average discharge voltage of button battery (V) | Battery cell expansion rate (%) after storage at 60° C. for 30 d | Number of cycles for 80% of capacity retention rate (%) at 45° C. |
|---|---|---|---|---|---|
| 1-1 | 8 | 158.2 | 3.78 | 1.9 | 1328 |
| 1-2 | 63 | 148.9 | 3.75 | 6.4 | 804 |
| 1-3 | 48 | 148.5 | 3.74 | 5.3 | 918 |
| 1-4 | 32 | 147.3 | 3.73 | 4.8 | 968 |
| 1-5 | 20 | 146.8 | 3.73 | 3.6 | 1064 |
| 1-6 | 15 | 145.9 | 3.72 | 2.8 | 1189 |
| 1-7 | 42 | 147.5 | 3.73 | 4.8 | 968 |
| 1-8 | 38 | 146.4 | 3.73 | 4.3 | 1012 |
| 1-9 | 29 | 144.3 | 3.73 | 3.7 | 1108 |
| 1-10 | 18 | 142.1 | 3.73 | 2.8 | 1219 |
| 1-11 | 34 | 147.8 | 3.74 | 5.2 | 927 |
| 1-12 | 22 | 147.6 | 3.74 | 6.1 | 897 |
| 1-13 | 18 | 147.2 | 3.74 | 6.9 | 816 |
| 1-14 | 9 | 147.0 | 3.75 | 7.5 | 764 |
| 1-15 | 18 | 138.7 | 3.86 | 8.4 | 857 |
| 1-16 | 14 | 139.4 | 3.86 | 4.5 | 974 |
| 1-17 | 13 | 153.2 | 3.78 | 3.2 | 1241 |
| 1-18 | 10 | 155.6 | 3.80 | 2.7 | 1245 |
| 1-19 | 9 | 157.6 | 3.80 | 2.1 | 1349 |
| 1-20 | 11 | 157.4 | 3.80 | 2.4 | 1368 |
| 1-21 | 8 | 158.4 | 3.72 | 2.0 | 1459 |
| 1-22 | 12 | 156.9 | 3.83 | 2.8 | 1283 |
| 1-23 | 11 | 157.1 | 3.83 | 2.5 | 1268 |
| 1-24 | 10 | 157.4 | 3.83 | 2.6 | 1329 |
| 1-25 | 10 | 157.3 | 3.78 | 2.4 | 1369 |
| 1-26 | 12 | 156.1 | 3.85 | 2.9 | 1128 |
| 1-27 | 11 | 157.5 | 3.78 | 2.4 | 1394 |
| 1-28 | 13 | 156.8 | 3.89 | 3.2 | 1089 |
| 1-29 | 14 | 156.1 | 3.89 | 3.2 | 1038 |
| 1-30 | 16 | 155.8 | 3.89 | 3.1 | 948 |
| 1-31 | 17 | 155.4 | 3.89 | 3.0 | 917 |
| 1-32 | 18 | 154.8 | 3.89 | 2.8 | 897 |
| 1-33 | 20 | 154.5 | 3.89 | 2.7 | 879 |
| 2-1 | 147 | 145.2 | 3.72 | 5.6 | 698 |
| 2-2 | 97 | 149.2 | 3.74 | 4.7 | 869 |
| 2-3 | 29 | 151.3 | 3.75 | 3.8 | 1027 |
| 2-4 | 8 | 158.2 | 3.79 | 1.9 | 1328 |
| 3-1 | 49 | 155.2 | 3.67 | 5.6 | 1102 |
| 3-2 | 37 | 155.7 | 3.69 | 4.7 | 1203 |
| 3-3 | 28 | 156.4 | 3.72 | 3.8 | 1275 |
| 3-4 | 17 | 157.8 | 3.75 | 3.1 | 1305 |
| 3-5 | 9 | 158.5 | 3.78 | 2.4 | 1327 |
| 3-6 | 19 | 156.7 | 3.73 | 3.6 | 1257 |
| 3-7 | 38 | 154.8 | 3.69 | 4.8 | 1179 |
| 3-8 | 46 | 153.7 | 3.64 | 6.3 | 986 |
| 3-9 | 38 | 155.4 | 3.76 | 4.9 | 1021 |
| 3-10 | 27 | 156.3 | 3.77 | 4.2 | 1097 |
| 3-11 | 15 | 157.8 | 3.79 | 3.1 | 1184 |
| 3-12 | 11 | 158.1 | 3.79 | 2.4 | 1297 |
| 4-1 | — | 155.4 | 3.71 | 3.4 | 1183 |
| 4-2 | — | 157.8 | 3.78 | 2.4 | 1347 |
| 4-3 | — | 156.5 | 3.73 | 3.1 | 1277 |
| 4-4 | — | 153.8 | 3.69 | 3.9 | 984 |
| 4-5 | — | 155.5 | 3.71 | 3.5 | 895 |
| 4-6 | — | 156.3 | 3.72 | 3.1 | 963 |
| 4-7 | — | 156.9 | 3.74 | 2.7 | 1043 |

Moreover, by comparing the data in Table 7 with the data in Table 1 to Table 3 mentioned above, it can be seen that the composition of the electrolyte solution of the present application can further increase the energy density and cycling performance of the secondary battery.

It should be noted that the present application is not limited to the above embodiments. The above embodiments are merely illustrative, and embodiments having substantively the same composition as the technical idea and exerting the same effects within the scope of the technical solution of the present application are all included in the technical scope of the present application. In addition, without departing from the scope of the subject matter of the present application, various modifications applied to the embodiments that can be conceived by those skilled in the art, and other modes constructed by combining some of the constituent elements of the embodiments are also included in the scope of the present application.

What is claimed is:

1. A secondary battery, comprising a positive electrode plate and a non-aqueous electrolyte solution, wherein
the positive electrode plate comprises a positive electrode active material, the positive electrode active material comprises an inner core and a shell cladding the inner core, and
the inner core comprises $Li_{1+x}Mn_{1-y}A_yP_{1-z}R_zO_4$, wherein $x=-0.100$-$0.100$, $y=0.001$-$0.500$, $z=0.001$-$0.100$, A is selected from one or more elements in a group consisting of Zn, Al, Na, K, Mg, Mo, W, Ti, V, Zr, Fe, Ni, Co, Ga, Sn, Sb, Nb and Ge, and optionally one or more elements in a group consisting of Fe, Ti, V, Ni, Co and Mg, and R is selected from one or more elements in a group consisting of B, Si, N and S;
the shell comprises a first cladding layer cladding the inner core, and a second cladding layer cladding the first cladding layer, wherein
the first cladding layer comprises pyrophosphate $MP_2O_7$ and phosphate $XPO_4$, wherein M and X are each independently selected from one or more elements in a group consisting of Li, Fe, Ni, Mg, Co, Cu, Zn, Ti, Ag, Zr, Nb and Al,
and the second cladding layer comprises carbon;
the non-aqueous electrolyte solution comprises a first additive, and the first additive comprises one or more compounds in a group consisting of a compound shown in Formula 1, a compound shown in Formula 2 and a compound shown in Formula 3:

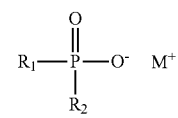

Formula 1

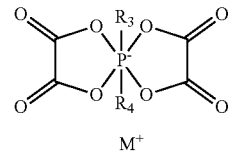

Formula 2

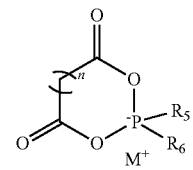

Formula 3

R₁ and R₂ each independently represent any one of F, C1-C6 fluoroalkyl, C1-C6 alkyl, C1-C6 alkoxy, C2-C6 alkenyl, C2-C6 alkynyl and C6-C10 aryl, and at least one of R1 and R2 represents any one of F or C1-C6 fluoroalkyl;

R₃ and R₄ each independently represent any one of F, C1-C6 fluoroalkyl, C1-C6 alkyl, C1-C6 alkoxy, C2-C6 alkenyl and C2-C6 alkynyl, and at least one of R₃ and R₄ represents any one of F or C1-C6 fluoroalkyl;

R₅ and R₆ each independently represent any one of F, C1-C6 fluoroalkyl, C1-C6 alkyl, C1-C6 alkoxy, C2-C6 alkenyl, C2-C6 alkynyl, carbonyl, O—, =O, —⁻BF3 and —O—BF₃;

M in each chemical formula each independently represents one of alkali metals and alkaline-earth metals; and n is 0, 1 or 2.

2. The secondary battery according to claim 1, wherein

R₁ and R₂ each independently represent any one of F, C1-C3 fluoroalkyl, C1-C3 alkyl, C1-C3 alkoxy, C2-C3 alkenyl, C2-C3 alkynyl, phenyl, benzyl and methylphenyl, and at least one of R1 and R2 represents any one of F or C1-C3 fluoroalkyl; and/or R₃ and R₄ each independently represent any one of F, C1-C3 fluoroalkyl, C1-C3 alkyl, C1-C3 alkoxy, C2-C3 alkenyl and C2-C3 alkynyl, and at least one of R₃ and R₄ represents any one of F and C1-C3 fluoroalkyl and/or R₅ and R₆ each independently represent any one of F, C1-C3 fluoroalkyl, C1-C3 alkyl, C1-C3 alkoxy, C2-C6 alkenyl, C2-C6 alkynyl, carbonyl, O—, =O, —⁻BF₃ and —O⁻BF₃; and/or M in each chemical formula each independently represents one of Li, Na and K.

3. The secondary battery according to claim 1, wherein the first additive comprises one or more of the following compounds:

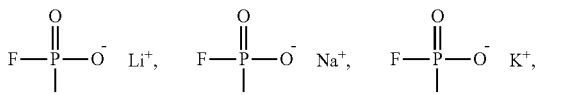

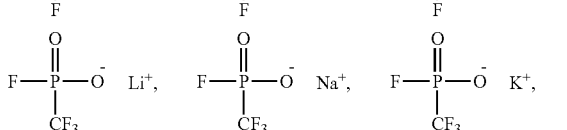

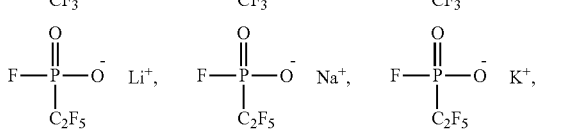

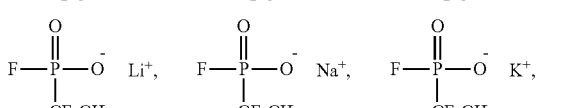

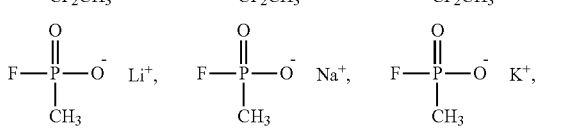

-continued

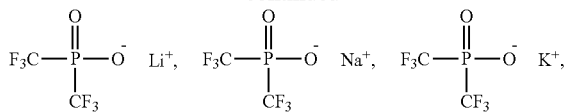

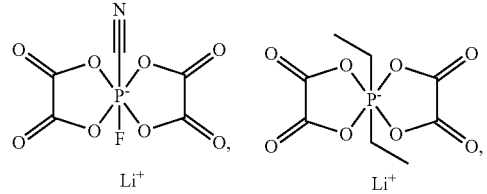

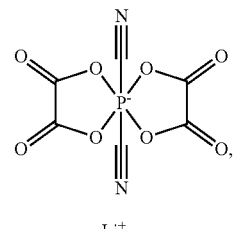

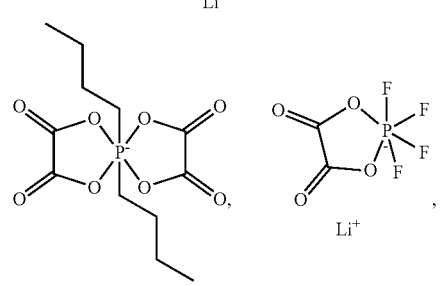

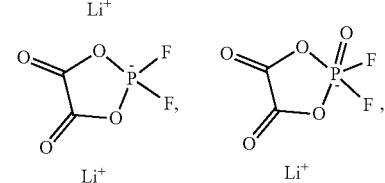

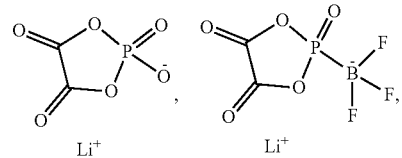

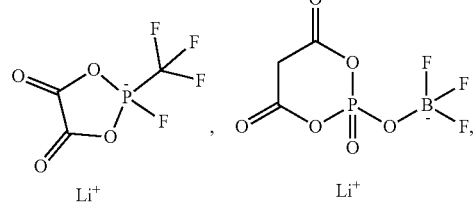

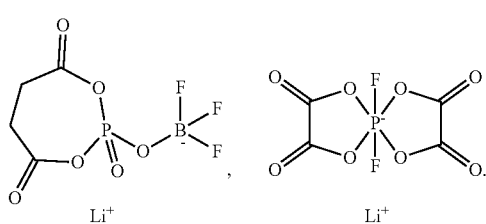

4. The secondary battery according to claim 1, wherein the first additive comprises any one or more of the following compounds:

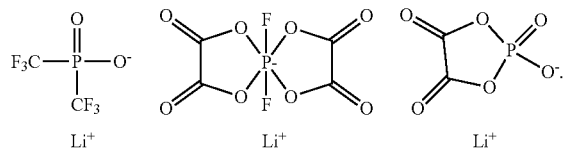

5. The secondary battery according to claim 1, wherein the non-aqueous electrolyte solution further comprises a second additive, and the second additive comprises one or more of compounds in a group consisting of a cyclic carbonate compound containing unsaturated bonds, a halogen-substituted cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphite compound, a phosphate compound and a borate compound.

6. The secondary battery according to claim 5, wherein based on a total weight of the non-aqueous electrolyte solution, a content of the first additive is W1 wt %, and W1 is 0.01 to 20, and;
the W1/W2 is defined as M, and M is 0.001 to 20.

7. The secondary battery according to claim 1, wherein the non-aqueous electrolyte solution further comprises an organic solvent and an electrolyte salt,
the organic solvent comprises one or more of a cyclic carbonate compound, a chain carbonate compound and a carboxylate compound, and further comprises one or more components in a group consisting of dimethyl carbonate, diethyl carbonate, dipropyl carbonate, ethyl methyl carbonate, methyl propyl carbonate, ethyl propyl carbonate, ethylene carbonate, propylene carbonate, butene carbonate, gamma-butyrolactone, methyl formate, ethyl formate, methyl acetate, ethyl acetate, propyl acetate, methyl propionate, ethyl propionate, butyl propionate and tetrahydrofuran.

8. The secondary battery according to claim 1, wherein based on the weight of the inner core, the cladding amount of the first cladding layer is C1 wt %, and C1 is greater than 0 and less than or equal to 7, and optionally 4 to 5.6; and/or
based on the weight of the inner core, the cladding amount of the second cladding layer is C2 wt %, and C2 is greater than 0 and less than or equal to 6, and optionally 3 to 5.

9. The secondary battery according to claim 4, wherein based on a weight of the inner core, the cladding amount of the first cladding layer is C1 wt %, and C1 is greater than 0 and less than or equal to 7; and/or
based on the weight of the inner core, the cladding amount of the second cladding layer is C2 wt %, and C2 is greater than 0 and less than or equal to 6;
wherein a relational expression W1/(C1+C2) between a content W1 of the first additive and the cladding amount C1 of the first cladding layer as well as the cladding amount C2 of the second cladding layer is C, and C is 0.001 to 2.

10. The secondary battery according to claim 1, wherein the weight ratio of pyrophosphate to phosphate in the first cladding layer is 1:3 to 3:1, and optionally 1:3 to 1:1.

11. The secondary battery according to claim 1, wherein the interplanar spacing of phosphate in the first cladding layer is 0.345 to 0.358 nm, and an included angle between crystal orientations (111) is 24.25° to 26.45°; and
an interplanar spacing of pyrophosphate in the first cladding layer is 0.293 to 0.326 nm, and an included angle between crystal orientations (111) is 26.41° to 32.57°.

12. The secondary battery according to claim 1, wherein in the inner core, a ratio of y to 1-y is 1:10 to 10:1; and/or
in the inner core, a ratio of z to 1-z is 1:9 to 1:999, and optionally 1:499 to 1:249.

13. The secondary battery according to claim 1, wherein a crystallinity of pyrophosphate and phosphate is each independently 10% to 100%, and optionally 50% to 100%.

14. The secondary battery according to claim 1, wherein A is selected from at least two of Fe, Ti, V, Ni, Co and Mg.

15. The secondary battery according to claim 1, wherein a Li/Mn antisite defect concentration of the positive electrode active material is 4% or less, and optionally 2% or less.

16. The secondary battery according to claim 1, wherein a lattice change rate of the positive electrode active material is 6% or less, and optionally 4% or less.

17. The secondary battery according to claim 1, wherein a surface oxygen valence state of a positive electrode active material is −1.88 or less, and optionally −1.98 to −1.88.

18. The secondary battery according to claim 1, wherein a compacted density of the positive electrode active material at 3 tons (T) is 2.0 g/cm$^3$ or more, and optionally 2.2 g/cm$^3$ or more.

19. A battery module, comprising a plurality of the secondary batteries according to claim 1.

20. A battery pack, comprising a plurality of the battery modules according to claim 19.

* * * * *